US012494602B2

(12) United States Patent
Yao et al.

(10) Patent No.: US 12,494,602 B2
(45) Date of Patent: Dec. 9, 2025

(54) COMBO CONNECTOR

(71) Applicant: FCI Nantong Ltd., Nantong (CN)

(72) Inventors: Zelin Yao, Nantong (CN); Changjiang Zhao, Nantong (CN); Iuokui Zhang, Nantong (CN); Xinwei Wang, Nantong (CN)

(73) Assignee: FCI Nantong Ltd., Nantong (CN)

(*) Notice: Subject to any disclaimer, the term of this patent is extended or adjusted under 35 U.S.C. 154(b) by 759 days.

(21) Appl. No.: 17/858,231

(22) Filed: Jul. 6, 2022

(65) Prior Publication Data

US 2023/0011722 A1 Jan. 12, 2023

(30) Foreign Application Priority Data

Jul. 7, 2021 (CN) ........................ 202121530443.3
Dec. 29, 2021 (CN) ........................ 202123368293.3

(51) Int. Cl.
*H01R 13/432* (2006.01)
*H01R 13/422* (2006.01)
*H01R 13/6461* (2011.01)
*H01R 12/72* (2011.01)

(52) U.S. Cl.
CPC ....... *H01R 13/432* (2013.01); *H01R 13/4223* (2013.01); *H01R 13/6461* (2013.01); *H01R 12/724* (2013.01)

(58) Field of Classification Search
None
See application file for complete search history.

(56) References Cited

U.S. PATENT DOCUMENTS 591,691 A 10/1897 Reddick
620,896 A 3/1899 Edgar
3,654,586 A 4/1972 Winkler
4,352,538 A 10/1982 Fowler
4,776,813 A 10/1988 Wilson et al.
4,812,133 A 3/1989 Fleak et al.
4,921,435 A 5/1990 Kane et al.
(Continued)

FOREIGN PATENT DOCUMENTS

CN 201478560 U 5/2010
CN 101071919 B 3/2011
(Continued)

OTHER PUBLICATIONS

[No Author Listed], Belden Patent Information. 2020, 7 pages. URL:https://www.belden.com/resources/patents [retrieved Mar. 27, 2020].

(Continued)

*Primary Examiner* — Tho D Ta
(74) *Attorney, Agent, or Firm* — Wolf, Greenfield & Sacks, P.C.

(57) ABSTRACT

A connector configured to provide signal and power connections reliably and economically in a compact space. The connector may include terminals each comprising a mating portion and a mounting portion opposite the mating portion. The terminals may be arranged with multiple rows of signal terminals and power terminals aligned in one row and on opposite sides of the signal rows. The mounting portions of the terminals may be configured to receive cables in some embodiments, and mount to a board in some other embodiments.

25 Claims, 21 Drawing Sheets

(56) References Cited

U.S. PATENT DOCUMENTS 4,963,098 A 10/1990 Myer et al.
4,988,308 A 1/1991 Toedtman
5,002,497 A 3/1991 Plocek et al.
5,017,151 A 5/1991 Peterson
5,037,323 A 8/1991 Locati
5,071,369 A 12/1991 Denlinger et al.
5,071,374 A 12/1991 Plocek et al.
5,176,528 A 1/1993 Fry et al.
5,181,862 A 1/1993 Hawk et al.
5,281,168 A 1/1994 Krehbiel et al.
5,314,358 A 5/1994 Klemmer et al.
5,334,058 A 8/1994 Hotea
5,342,223 A 8/1994 Geib
5,385,491 A 1/1995 Fry
5,407,363 A 4/1995 Polgar et al.
5,435,742 A 7/1995 Cecil, Jr.
5,466,171 A 11/1995 Bixler et al.
5,486,118 A 1/1996 Colleran et al.
5,489,224 A 2/1996 Schwarz
5,514,000 A 5/1996 Krause et al.
5,520,553 A 5/1996 Cecil, Jr. et al.
5,522,740 A 6/1996 Plocek et al.
5,575,673 A 11/1996 Dahlem et al.
5,575,692 A 11/1996 Cecil, Jr. et al.
5,595,509 A 1/1997 Fry et al.
5,607,318 A 3/1997 Wakata et al.
5,643,018 A 7/1997 Sakai et al.
5,647,772 A 7/1997 Martucci et al.
5,651,704 A 7/1997 Fukushima et al.
5,681,175 A 10/1997 Busse et al.
5,697,805 A 12/1997 Orstad et al.
5,738,543 A 4/1998 Rollins et al.
5,779,500 A 7/1998 Tokuwa et al.
5,785,536 A 7/1998 McCartin et al.
5,803,759 A 9/1998 Griffith et al.
5,890,935 A 4/1999 Pill
5,928,038 A 7/1999 Berg et al.
5,967,859 A 10/1999 Cecil, Jr. et al.
5,980,318 A 11/1999 Morello et al.
5,997,691 A 12/1999 Gautam et al.
6,039,603 A 3/2000 Wakata et al.
6,139,346 A 10/2000 Cecil, Jr. et al.
6,146,190 A 11/2000 Fuerst et al.
6,176,738 B1 1/2001 Consoli et al.
6,190,203 B1 2/2001 Murakami et al.
6,196,856 B1 3/2001 De Villeroche
6,220,894 B1 4/2001 Bigotto et al.
6,234,817 B1 5/2001 Hwang
6,244,900 B1 6/2001 Ishikawa et al.
6,290,536 B1 9/2001 Hwang et al.
6,315,590 B1 11/2001 Grois et al.
6,315,606 B1 11/2001 Hwang
6,368,155 B1 4/2002 Bassler et al.
6,379,184 B1 4/2002 Bassler et al.
6,435,891 B1 8/2002 Beck, Jr. et al.
6,450,834 B1 9/2002 Polgar et al.
6,544,070 B1 4/2003 Radliff
6,547,584 B2 4/2003 Myer et al.
6,692,303 B2 2/2004 Fukatsu
6,755,696 B1 6/2004 Ko
6,790,101 B1 9/2004 Data et al.
6,865,085 B1 3/2005 Ferris et al.
6,910,905 B2 6/2005 Tanaka et al.
6,913,486 B2 7/2005 Nagayasu et al.
6,913,493 B2 7/2005 Berg et al.
6,918,798 B2 7/2005 Patel et al.
6,935,893 B1 8/2005 Flowers et al.
6,960,099 B2 11/2005 McAlonis
7,004,790 B2 2/2006 Martin et al.
7,029,328 B1 4/2006 Mckenzie et al.
7,033,216 B2 4/2006 Ito
7,044,813 B2 5/2006 Amara et al.
7,048,582 B2 5/2006 Tabata et al.
7,048,583 B1 5/2006 Osada et al.
7,048,584 B1 5/2006 Morello et al.
7,056,147 B2 6/2006 Arias et al.
7,112,105 B2 9/2006 Wu
7,114,991 B2 10/2006 Shiga et al.
7,137,847 B2 11/2006 Trout et al.
7,137,848 B1 * 11/2006 Trout .................. H01R 13/514
439/465
7,153,152 B1 12/2006 Eby et al.
7,168,978 B1 1/2007 Trout et al.
7,179,136 B1 2/2007 Morello
7,192,307 B1 3/2007 Tran et al.
7,192,318 B2 3/2007 Hotea et al.
7,232,339 B1 6/2007 Wilson et al.
7,252,553 B2 8/2007 Morello et al.
7,252,559 B1 8/2007 Morello et al.
7,273,395 B2 9/2007 Hayashi
7,335,043 B2 * 2/2008 Ngo .................... H01R 13/113
439/857
7,338,319 B2 3/2008 Cases et al.
7,351,102 B2 4/2008 Cykon et al.
7,402,087 B2 7/2008 Wang
7,448,894 B2 11/2008 Tsuji et al.
7,465,192 B2 12/2008 McKenzie et al.
D591,691 S 5/2009 Baker et al.
7,553,188 B2 6/2009 Whiteman, Jr. et al.
7,670,193 B2 3/2010 Milette et al.
7,682,180 B2 3/2010 Brown et al.
7,686,647 B1 3/2010 Hong
7,690,937 B2 * 4/2010 Daily .................. H01R 12/725
439/79
7,713,077 B1 5/2010 McGowan et al.
7,746,535 B2 6/2010 Kelley et al.
7,762,842 B2 7/2010 Deubel et al.
D620,896 S 8/2010 Petersen
7,789,701 B2 9/2010 Murr et al.
7,867,028 B2 1/2011 Brown
7,867,042 B2 1/2011 Shuey
7,883,376 B2 2/2011 Milette et al.
7,922,530 B2 4/2011 Chazottes et al.
7,946,874 B2 5/2011 Sakamaki et al.
7,976,351 B2 7/2011 Boemmel et al.
8,064,182 B2 11/2011 Baker et al.
8,133,076 B2 3/2012 Nakamura
8,147,279 B1 4/2012 Martin et al.
8,167,662 B2 5/2012 Milette et al.
8,210,861 B2 7/2012 Tanis et al.
8,323,061 B2 12/2012 Hori
8,337,259 B2 12/2012 Chen et al.
8,388,388 B2 3/2013 Suzuki et al.
8,411,404 B2 4/2013 Petersen
8,414,323 B2 4/2013 Yu et al.
8,550,860 B2 10/2013 Dick et al.
8,696,390 B2 4/2014 Tai et al.
8,784,133 B2 7/2014 Suzuki
8,834,190 B2 * 9/2014 Ngo .................. H01R 12/7023
439/328
9,136,652 B2 * 9/2015 Ngo ....................... H01R 24/20
9,142,907 B2 9/2015 Jones et al.
9,153,879 B2 10/2015 Frimmersdorf et al.
9,153,899 B2 10/2015 Morello et al.
9,252,546 B2 2/2016 Busse et al.
9,300,085 B2 3/2016 Morello et al.
9,318,838 B2 4/2016 Karadimas et al.
9,318,841 B2 4/2016 Gimbel et al.
9,362,659 B2 6/2016 Jones et al.
9,397,455 B2 7/2016 Fontaine et al.
9,413,125 B2 8/2016 Fontaine et al.
9,455,527 B2 9/2016 Briccarello
9,490,568 B2 11/2016 Luthy et al.
9,496,667 B2 11/2016 Gardner
9,614,325 B2 4/2017 Yuan et al.
9,614,329 B2 4/2017 Chen et al.
9,620,879 B2 4/2017 Li
D791,080 S 7/2017 Li et al.
D791,082 S 7/2017 Li et al.
D791,083 S 7/2017 Li et al.
D791,704 S 7/2017 Li et al.
D791,705 S 7/2017 Li et al.
D791,706 S 7/2017 Li et al.
D791,707 S 7/2017 Li et al.

(56) References Cited

U.S. PATENT DOCUMENTS

| | | | |
|---|---|---|---|
| D792,851 | S | 7/2017 | Li et al. |
| D792,852 | S | 7/2017 | Li et al. |
| D792,853 | S | 7/2017 | Li et al. |
| 9,698,501 | B2 | 7/2017 | Liptak et al. |
| 9,735,526 | B1 * | 8/2017 | Chen .................. H01R 12/7088 |
| 9,761,977 | B2 | 9/2017 | Yang |
| D801,278 | S | 10/2017 | Li et al. |
| 9,799,976 | B2 | 10/2017 | Lehner et al. |
| D802,538 | S | 11/2017 | Li et al. |
| D803,161 | S | 11/2017 | Li et al. |
| D803,162 | S | 11/2017 | Li et al. |
| 9,819,111 | B2 | 11/2017 | Holub et al. |
| 9,847,597 | B2 | 12/2017 | Uttarkar et al. |
| 9,865,960 | B2 | 1/2018 | Fontaine et al. |
| 9,865,995 | B2 | 1/2018 | Baker et al. |
| 9,954,306 | B2 | 4/2018 | Taguchi et al. |
| 9,972,932 | B2 | 5/2018 | Copper et al. |
| 10,122,108 | B2 | 11/2018 | Bhagyanathan Sathianathan et al. |
| 10,186,797 | B2 | 1/2019 | Fontaine et al. |
| 10,230,189 | B2 | 3/2019 | Droesbeke et al. |
| 10,263,350 | B2 | 4/2019 | Huo et al. |
| D847,759 | S | 5/2019 | Bhagyanathan Sathianathan et al. |
| 10,355,397 | B2 | 7/2019 | Hirota |
| D855,574 | S | 8/2019 | Bhagyanathan Sathianathan et al. |
| 10,374,328 | B2 | 8/2019 | Bhagyanathan-Sathlanathan et al. |
| 10,381,766 | B2 | 8/2019 | Bhagyanathan Sathianathan et al. |
| 10,418,742 | B1 | 9/2019 | Gonzalez Delgadillo et al. |
| 10,420,470 | B2 | 9/2019 | Kwon et al. |
| 10,439,316 | B2 | 10/2019 | Leonhardt |
| 10,468,813 | B2 | 11/2019 | Zhang et al. |
| 10,476,197 | B2 | 11/2019 | Fontaine et al. |
| D882,525 | S | 4/2020 | Bhagyanathan Sathianathan et al. |
| D882,526 | S | 4/2020 | Bhagyanathan Sathianathan et al. |
| 10,840,626 | B2 | 11/2020 | Li et al. |
| 10,879,639 | B2 | 12/2020 | Droesbeke et al. |
| 2003/0017730 | A1 | 1/2003 | Bassler et al. |
| 2004/0171309 | A1 | 9/2004 | Baker et al. |
| 2005/0014422 | A1 | 1/2005 | Patel et al. |
| 2005/0176298 | A1 | 8/2005 | Flowers et al. |
| 2006/0040533 | A1 | 2/2006 | Koshy et al. |
| 2006/0040534 | A1 | 2/2006 | Flowers |
| 2006/0040536 | A1 | 2/2006 | Putnam et al. |
| 2007/0264864 | A1 | 11/2007 | Andre et al. |
| 2008/0076283 | A1 | 3/2008 | Bouchan et al. |
| 2008/0311798 | A1 | 12/2008 | Wang |
| 2009/0298304 | A1 | 12/2009 | Brunker et al. |
| 2010/0041266 | A1 * | 2/2010 | Data .................. H01R 12/7088 439/717 |
| 2010/0210154 | A1 | 8/2010 | Boemmel et al. |
| 2010/0317227 | A1 | 12/2010 | Bouchan et al. |
| 2011/0207357 | A1 | 8/2011 | Dick et al. |
| 2012/0244756 | A1 | 9/2012 | Jouas et al. |
| 2013/0084716 | A1 | 4/2013 | Namjoshi et al. |
| 2013/0294081 | A1 | 11/2013 | O'Connor et al. |
| 2013/0316560 | A1 | 11/2013 | Yoon et al. |
| 2014/0127945 | A1 * | 5/2014 | Yu ........................ H01R 13/428 439/626 |
| 2014/0273604 | A1 | 9/2014 | Briccarello |
| 2014/0363987 | A1 | 12/2014 | Hodge et al. |
| 2015/0118880 | A1 | 4/2015 | Murphy et al. |
| 2015/0155670 | A1 | 6/2015 | Gardner |
| 2016/0056563 | A1 | 2/2016 | Luthy et al. |
| 2016/0149363 | A1 | 5/2016 | Patel et al. |
| 2016/0181716 | A1 | 6/2016 | Ramanna et al. |
| 2016/0181732 | A1 | 6/2016 | Laurx et al. |
| 2016/0336669 | A1 | 11/2016 | Li |
| 2016/0352030 | A1 | 12/2016 | Jin et al. |
| 2016/0359251 | A1 | 12/2016 | Droesbeke et al. |
| 2017/0006733 | A1 | 1/2017 | Gregori et al. |
| 2017/0062964 | A1 | 3/2017 | Yang |
| 2017/0077646 | A1 | 3/2017 | Kim |
| 2017/0207575 | A1 | 7/2017 | Jabrane et al. |
| 2017/0207594 | A1 | 7/2017 | Jabrane et al. |
| 2017/0237194 | A1 | 8/2017 | Duggan et al. |
| 2017/0250490 | A1 | 8/2017 | Beischer et al. |
| 2017/0294731 | A1 | 10/2017 | Leonhardt |
| 2018/0076562 | A1 | 3/2018 | Zhang et al. |
| 2018/0301842 | A1 | 10/2018 | Somanathapura Ramanna |
| 2019/0288439 | A1 | 9/2019 | Bae et al. |
| 2019/0305469 | A1 | 10/2019 | Nguyen Nhu et al. |
| 2019/0312372 | A1 | 10/2019 | Droesbeke et al. |
| 2019/0356087 | A1 | 11/2019 | Pamart |
| 2020/0127408 | A1 | 4/2020 | Jabrane et al. |

FOREIGN PATENT DOCUMENTS

| | | | |
|---|---|---|---|
| CN | 202308503 | U | 7/2012 |
| CN | 202373782 | U | 8/2012 |
| CN | 202384538 | U | 8/2012 |
| CN | 202749615 | U | 2/2013 |
| CN | 203589290 | U | 5/2014 |
| CN | 203707415 | U | 7/2014 |
| CN | 203707439 | U | 7/2014 |
| CN | 203707480 | U | 7/2014 |
| CN | 104217545 | A | 12/2014 |
| CN | 204018795 | U | 12/2014 |
| CN | 204019172 | U | 12/2014 |
| CN | 204030232 | U | 12/2014 |
| CN | 204030244 | U | 12/2014 |
| CN | 204108959 | U | 1/2015 |
| CN | 204424524 | U | 6/2015 |
| CN | 105098434 | A | 11/2015 |
| CN | 103748745 | B | 8/2016 |
| CN | 304122868 | S | 5/2017 |
| CN | 304122869 | S | 5/2017 |
| CN | 304122870 | S | 5/2017 |
| CN | 304122871 | S | 5/2017 |
| CN | 304122872 | S | 5/2017 |
| CN | 304122875 | S | 5/2017 |
| CN | 304122876 | S | 5/2017 |
| CN | 304151247 | S | 5/2017 |
| CN | 304151248 | S | 5/2017 |
| CN | 304168295 | S | 6/2017 |
| CN | 209282492 | U | 8/2019 |
| CN | 209282495 | U | 8/2019 |
| CN | 110444953 | A | 11/2019 |
| EP | 0600419 | A1 | 6/1994 |
| EP | 0702430 | A2 | 3/1996 |
| EP | 2193577 | A2 | 6/2010 |
| FR | 3044172 | A1 | 5/2017 |
| FR | 3048131 | A1 | 8/2017 |
| FR | 3048133 | A1 | 8/2017 |
| FR | 3048134 | A1 | 8/2017 |
| FR | 3048135 | A1 | 8/2017 |
| GB | 2262664 | B | 7/1995 |
| JP | 2014-006283 | A | 1/2014 |
| KR | 20070120353 | A | 12/2007 |
| KR | 20140122904 | A | 10/2014 |
| KR | 20140143529 | A | 12/2014 |
| KR | 20150021808 | A | 3/2015 |
| TW | M251312 | U | 11/2004 |
| TW | 201409846 | A | 3/2014 |
| TW | 201414092 | A | 4/2014 |
| TW | M484449 | U | 8/2014 |
| TW | M485535 | U | 9/2014 |
| TW | M485549 | U | 9/2014 |
| TW | M485550 | U | 9/2014 |
| TW | M508134 | U | 9/2015 |
| TW | 201543759 | A | 11/2015 |
| TW | I535122 | B | 5/2016 |
| TW | M523211 | U | 6/2016 |
| WO | WO 98/35404 | A1 | 8/1998 |
| WO | WO 2008/157488 | A1 | 12/2008 |
| WO | WO 2009/131860 | A1 | 10/2009 |
| WO | WO 2010/132736 | A1 | 11/2010 |
| WO | WO 2013/050321 | A1 | 4/2013 |

(56) References Cited

FOREIGN PATENT DOCUMENTS

| | | | |
|---|---|---|---|
| WO | WO 2015/112968 | A1 | 7/2015 |
| WO | WO 2015/112975 | A1 | 7/2015 |
| WO | WO DM/093628 | | 5/2017 |
| WO | WO 2017/139249 | A1 | 8/2017 |
| WO | WO 2019/178434 | A1 | 9/2019 |
| WO | WO 2019/178520 | A1 | 9/2019 |

OTHER PUBLICATIONS

[No Author Listed], CommScope Product Patent. 2020, 7 pages. URL:https://extapps.commscope.com/ProductPatent/ProductPatent.aspx [retrieved Mar. 27, 2020].

[No Author Listed], Delphi Flexible Beam Technology (FBT) for Connectors. 2020, 3 pages. [retrieved Mar. 28, 2020].

[No Author Listed], Molex High Current-Density Mega-Fit Power Connectors Fill a Critical Power Gap With a Small Footprint. Molex. Business Wire. Feb. 13, 2014. 2 pages. URL:https://www.businesswire.com/news/home/20140213005491/en/Molex-High-Current-Density-Mega-Fit-Power-Connectors-Fill [retrieved May 12, 2023].

[No Author Listed], Micro-Fit Connector System. Molex. 2023, 3 pages. URL:https://www.molex.com/molex/products/family/microfit_30 [retrieved Feb. 16, 2023].

[No Author Listed], Mini-Fit Family Power Connectors. Molex. 2023, 3 pages. URL:https://www.molex.com/molex/products/family/minifit_power_connectors_solutions [retrieved Feb. 16, 2023].

[No Author Listed], Nano-Fit Power Connectors. Molex. 2023, 2 pages. URL:https://www.molex.com/molex/products/family/nanofit_power_connectors [retrieved Feb. 16, 2023].

[No Author Listed], PCB Headers 1720651012. Molex. 2023, 1 page. URL:https://www.molex.com/molex/products/part-detail/pcb_headers/1720651012 [retrieved Feb. 16, 2023].

* cited by examiner

C-C

COMBO CONNECTOR

RELATED APPLICATIONS

This application claims priority to and the benefit of Chinese patent application Ser. No. 202121530443.3, filed Jul. 7, 2021, entitled "A TYPE OF COMBO CONNECTOR," the entire content of which is incorporated herein by reference in its entirety. This application also claims priority to and the benefit of Chinese Patent Application Serial No. 202123368293.3, filed Dec. 29, 2021, entitled "COMBO CONNECTOR," the entire content of which is incorporated herein by reference in its entirety.

FIELD

This application relates generally to electrical interconnection systems, such as those including cables, used to interconnect electronic components.

BACKGROUND

Cables may be used to interconnect electronic components that are separated by a distance. As electronic systems become increasingly more complex, an electrical connector may be used to establish the electrical connections between a plurality of cables and a circuit board on which some of the electronic components to be interconnected are mounted. Cables, for example, may be used to make signal and power connections to a circuit board serving as a control module in an automobile or a washing machine.

BRIEF SUMMARY

Aspects of the present disclosure relate to combo cable connectors.

Some embodiments relate to a connector. The connector may include a housing; and a plurality of terminals held by the housing, each of the plurality of terminals comprising a mating portion and a mounting portion opposite the mating portion and configured to receive a cable. The plurality of terminals may include one or more rows of signal terminals, the mating portion of each signal terminal comprising one pair of beams, and one or more power terminals disposed on opposite sides of the one or more rows of signal terminals, the mating portion of each power terminal comprising two pairs of beams.

In some embodiments, the one or more rows of signal terminals may comprise a first row of signal terminals and a second row of signal terminals.

In some embodiments, the signal terminals in the first row may be offset from the signal terminals in the second row in a row direction.

In some embodiments, the first row may consist of an odd number of signal terminals and the second row may consist of an even number of signal terminals, or the first row may consist of an even number of signal terminals and the second row may consist of an odd number of signal terminals.

In some embodiments, the one or more power terminals may be disposed in a single row with equal number of power terminals on opposite sides of the first and second rows of signal terminals.

In some embodiments, the one or more rows of signal terminals may consist of the first row and the second row.

In some embodiments, the housing may comprise one or more first holes each holding one of the one or more rows of signal terminals, and one or more second holes each holding one of the one or more power terminals.

In some embodiments, the one or more first holes may comprise a first row of first holes and a second row of first holes. The housing may comprise a row of recesses between the first row of first holes and the second row of first holes.

In some embodiments, the housing may comprise a mating face that may include a first portion comprising at least one power terminal hole, a second portion comprising at least one power terminal hole, wherein the one or more power terminals disposed on opposite sides of the one or more rows of signal terminals are disposed within respective power terminal holes of the first portion and the second portion, and a third portion comprising a plurality of signal terminal holes disposed between the first portion and the second portion of the mating face, wherein the signal terminals of the one or more rows of signal terminals are disposed within respective signal terminal holes of the plurality of signal terminal holes.

In some embodiments, the third portion of the mating face may be recessed with respect to the first portion and the second portion.

In some embodiments, each of the one or more power terminals may comprise a metal sheet with a plurality of bends such that the mating portion of the power terminal comprises two opposing sides, top and bottom.

In some embodiments, the two pairs of beams of the mating portion of each of the one or more power terminals may each comprise a beam on a side of the two opposing sides.

In some embodiments, the mating portion of each of the one or more power terminals may comprise a protrusion cut from and extending beyond the bottom.

In some embodiments, the housing may comprise one or more first holes each holding one of the one or more rows of signal terminals, and one or more second holes each holding one of the one or more power terminals. The one or more second holes may each comprise a slot for receiving the protrusion of the power terminal inserted in the second hole.

In some embodiments, a side of the two opposing sides may be fastened to the top.

In some embodiments, a perimeter of a front and/or rear of the mating portion may be rectangular.

In some embodiments, distal ends of the two pairs of beams may be separated from distal end of the mating portion by a front wall.

In some embodiments, proximal ends of the two pairs of beams may extend from a rear wall.

In some embodiments, the housing may comprise a plurality of holes and a plurality of beams curving into respective holes. The plurality of terminals may be held in respective holes of the housing and at least partially retained by respective beams of the housing. For each of the one or more power terminals, a distal end of the beam curving into a respective hole may be between the mating portion and the mounting portion of the power terminal inserted into the hole.

In some embodiments, for each of the one or more power terminals, the beam curving into a respective hole may be adjacent to the top of the mating portion of the power terminal inserted into the hole.

In some embodiments, each of the one or more rows of signal terminals may comprise a metal sheet with a plurality of bends such that the signal terminal may comprise a bottom and opposing sides extending from the bottom with the pair of beams projecting from the opposing sides, respectively.

In some embodiments, each of the one or more rows of signal terminals may comprise a pair of protrusions cut from and extending beyond the opposing sides, respectively.

In some embodiments, the housing may comprise one or more first holes each holding one of the one or more rows of signal terminals, and one or more second holes each holding one of the one or more power terminals. The one or more first holes may each comprise a pair of grooves for receiving the pair of protrusions of the signal terminal inserted into the first hole.

In some embodiments, the one or more signal terminals may comprise barbs cut from and extending beyond the bottom.

In some embodiments, the housing may comprise a plurality of holes and a plurality of beams curving into respective holes. The plurality of terminals may be held in respective holes of the housing and at least partially retained by respective beams of the housing. For each of the one or more rows of signal terminals, the beam curving into a respective hole may be adjacent to the bottom of the mating portion of the signal terminal inserted into the hole.

In some embodiments, the sides of each of the one or more rows of signal terminals may comprise stop-pieces extending away from the bottom.

In some embodiments, the housing may comprise a plurality of holes and a plurality of first limiting portions projecting into respective holes and configured to operate with the stop-pieces of respective signal terminals to hold the signal terminals in position.

In some embodiments, the housing may comprise a mating face, a mounting face opposite the mating face, and a spring arm bending from a proximal end adjacent the mating face towards a distal end adjacent the mounting face.

In some embodiments, the housing may comprise a pair of pillars extending on opposite sides of the spring arm. The pair of pillars may each comprise overhangs projecting toward the spring arm. The spring arm may comprise overhangs projecting toward the pair of pillars, respectively. The overhangs of the pillars may be on top of the overhangs of the spring arm so as to limit the movement of the spring arm.

In some embodiments, each of the plurality of terminals may comprise a bottom and barrels extending from the bottom. The plurality of terminals may be held by the housing such that the barrels of the signal terminals may extend toward a top of the housing and the barrels of the power terminals may extend toward a bottom of the housing.

In some embodiments, the connector may further comprise a plurality of signal cables connected to respective signal terminals; and a plurality of power cables connected to respective power terminals. The plurality of signal cables may be disposed in a first row along a row direction and a second row parallel to the first row. The plurality of power cables may be disposed in one row parallel to the first row. The row of power cables may be separate from the first row of signal cables by a first distance perpendicular to the row direction. The row of power cables may be separate from the second row of signal cables by a second distance perpendicular to the row direction. The first distance may be smaller than the second distance.

Some embodiments relate to a connector. The connector may include a housing; and a plurality of terminals held by the housing, each of the plurality of terminals comprising a mating portion and a mounting portion opposite the mating portion and configured to mount to a board. The plurality of terminals may include a first number of signal terminals, the mating portions of the first number of signal terminal aligned in a first row, a second number of signal terminals, the mating portions of the second number of signal terminal aligned in a second row, the second number being different from the first number, and one or more power terminals comprising mating portions disposed on opposite sides of the first and second rows of mating portions of the signal terminals.

In some embodiments, the mating portions of the signal terminals in the first row may be offset from the mating portions of the signal terminals in the second row in a row direction.

In some embodiments, the mating portions of the one or more power terminals may be disposed in a single row with equal number of power terminals on opposite sides of the first and second rows of mating portions of the signal terminals.

In some embodiments, the connector may include a reinforce member with soldering zones on two orthogonal sides and mounted in the housing with at least one of the two orthogonal sides exposed in a mounting face.

In some embodiments, the mounting portions of the plurality of terminals may be configured to surface mount to the board.

In some embodiments, the mounting portions of the first number of signal terminals and the second number of signal terminals may be aligned in one row and may each comprise a tin hole.

In some embodiments, the mounting portions of the first number of signal terminals and the second number of signal terminals may be aligned in two respective rows.

In some embodiments, the first number of signal terminals may each comprise a protrusion.

In some embodiments, the housing may comprise a polarization slot configured to receive a matching polarization wall of a mating connector.

In some embodiments, the connector may include a reinforce member vertically below a portion of the polarization slot.

Some embodiments relate to a connector. The connector may include a housing comprising a top and a bottom; and a plurality of terminals held by the housing, each of the plurality of terminals comprising a bottom and barrels extending from the bottom and configured to receive a cable, the plurality of terminals comprising one or more signal terminals and one or more power terminals, the barrels of the one or more signal terminals extending toward the top of the housing and the barrels of the one or more power terminals extending toward the bottom of the housing.

In some embodiments, the housing may comprise a spring arm extending above the top of the housing and a pair of pillars extending on opposite sides of the spring arm and configured to protect the spring arm and block over-insertion of a mating component into the connector.

In some embodiments, the housing may comprise an end wall and a polarization wall extending from the end wall.

In some embodiments, the polarization wall may extend perpendicular to the end wall.

Some embodiments relate to a connector assembly. The connector assembly may include a first connector of any of the above described embodiments, wherein the housing is a first housing and the plurality of terminals are a first plurality of terminals; and a second connector. The second connector may include a second housing enclosing at least a portion of the first housing, and a second plurality of terminals held by the second housing, each of the second plurality of terminals comprising a mating portion configured to mate with the mating portion of a respective terminal of the first plurality, a mounting portion opposite the mating portion and configured to mount to a board.

Some embodiments relate to a combo connector. The combo connector may include a cable housing and a header housing, the cable housing having a spring arm, the header housing having a track slot matched to the spring arm, and a connection being established between the cable housing and the header housing by insertion. Multiple cable power terminal holes may be provided symmetrically at two sides of the cable housing. Cable power terminals may be inserted in the cable power terminal holes. An upper row and a lower row of cable signal terminal holes may be provided in a middle part of the cable housing. Cable signal terminals may be inserted in the cable signal terminal holes. Multiple header power terminal holes may be provided symmetrically at two sides of the header housing. Header power terminals may be inserted in the header power terminal holes. An upper row and a lower row of header signal terminal holes may be provided in a middle part of the header housing, with a row of first header signal terminals and a row of second header signal terminals being inserted in the upper row and the lower row of header signal terminal holes, respectively. When the cable housing and the header housing are inserted into each other, the spring arm may be inserted into the track slot, the header power terminals may be inserted into the cable power terminals, and the first header signal terminals and second header signal terminals may be inserted into respective cable signal terminals.

In some embodiments, a set of polarization walls may be provided symmetrically at two ends of the cable housing, and polarization slots which are matched to the polarization walls for preventing wrong insertion are provided at corresponding positions at two sides of the header housing.

In some embodiments, a pair of first bent arms may be provided at a head of the cable signal terminal, a pair of stop-pieces may be provided in a middle part of the cable signal terminal, first protrusions may be provided at outer sides of the stop-pieces, and a barb may be provided at a lower part of the cable signal terminal.

In some embodiments, a first limiting portion may be provided on the cable housing at a position corresponding to the stop-piece, and a cable housing beam may be provided on the cable housing at a position corresponding to the barb.

In some embodiments, a fastening structure may be provided above the cable power terminal, a terminal head arm may be provided at one side of the cable power terminal, a second bent arm may be provided below the fastening structure, a limiting arm may be provided behind the fastening structure, and a second protrusion may be provided at a lower part of the cable power terminal.

In some embodiments, a cable housing step may be provided at a position on the cable housing corresponding to the limiting arm.

In some embodiments, a protrusion may be provided at a beam of the first header signal terminal, and a through-hole may be provided at one end of the header signal terminal.

In some embodiments, a through-hole may be provided at one end of the second header signal terminal.

In some embodiments, a bulge may be provided on the header power terminal.

The foregoing aspects may be used separately or together, in a combination of two or more aspects. Features and advantages of the present disclosure are described in detail below with reference to the accompanying drawings.

BRIEF DESCRIPTION OF DRAWINGS

The following accompanying drawings of the present disclosure are used here as a part of the present disclosure for understanding the present disclosure. The accompanying drawings are not intended to be drawn to scale. For purposes of clarity, not every component may be labeled in every drawing. In drawings.

DETAILED DESCRIPTION

Figure 1:
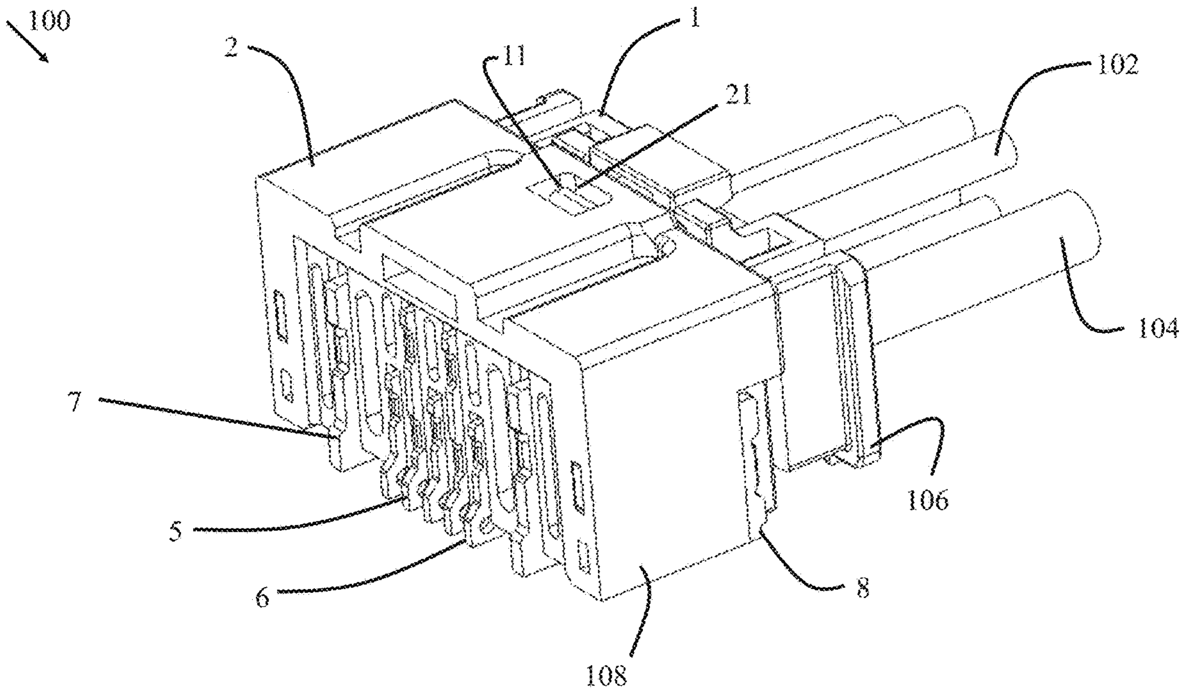
FIG. 1 is a perspective view of a mated cable connector and right angle board connector, according to some embodiments.

The inventors have recognized and appreciated designs for connectors that can provide both signal and power connections reliably and economically in a compact space. The connectors may reliably and economically connect both signal cables and power cables to a board.

Features of the terminals and/or the connector housing may enable integration of signal and power terminals into the same connector housing in a compact way. The signal and power terminals, for example, may be positioned in rows, extending in the longitudinal direction of the connector, with the power terminals being longer in a transverse direction orthogonal to the longitudinal direction. Such a configuration may enable two rows of signal terminals to be aligned with one row of power terminals. To support dense packing of terminals in this configuration, barrels for encircling cables may extend in opposite directions from bottoms of the signal and power terminals. Further, cooperating features of the connector housing and terminals may ensure insertion of the signal and power terminals with their bottoms facing in opposite directions.

Further density of the interconnect may be achieved by the relative position of the power terminals and polarization features on the connector housing. The power terminals, for example, may be adjacent the ends of the connector with multiple rows of signal terminals between them. Polarization features on the connector housing may be positioned at the ends of the housing adjacent to the power terminals. Where a row of power terminals occupies less space in the transverse direction than two rows of signal terminal, the polarization features, or structures supporting the polarization features, may be positioned above the power terminals in the transverse direction. Accordingly, in some embodiments, the polarization features of the housing may be at the corners of the housing above, in the transverse direction, power terminals.

The signal and/or power terminals may be configured to ensure reliable connections, even if each is simply formed from stamping a single sheet of metal. Both, for example, may provide opposing beams on sidewalls extending from the terminal bottom. The signal terminals, however, may have fewer pairs of opposing beams than the power terminals. The power terminals may have multiple pairs of opposing beams. For example, the signal terminals may have one pair of opposing beams, while the power terminals may have two pairs of opposing beams. To equalize the mating force of each pair of beams, the power terminals may be stabilized by folding the stamped sheet of metal into a rectangular configuration, with a top portion fixing the separation between sidewalls in which the opposing beams are formed.

The signal terminals may also include features for stable mating. The signal terminals, for example, may have protrusions, bent from either or both sidewalls that cooperate with features of the housing into which the terminals are inserted. Through that cooperation, the mating force may be reliably within a designed range.

Other features may ensure that the terminals may be easily, yet reliable inserted into the connector housing. These features may include protrusions from the power terminals that ensure insertion into a housing in a designed orientation and features, such as spring fingers in the housing, that engage the terminal when properly inserted. The signal terminals may have spring fingers extending from them that engage cooperating features of the housing. Such a configuration enables the power terminals to be configured for higher current densities as fewer cut portions of the terminal that might otherwise create high resistance portions of the power terminal are required for reliable retention in the housing, while enabling the signal terminals to be more closely spaced within the connector housing, as less housing material is required between signal terminals to provide reliable retention.

These features may be used together or in any suitable combination. They may be used, for example, to enable compact connections that can withstand the shock and vibration of a harsh environment, such as may occur when making connections to a control board in an automobile or washing machine, while still providing a compact form factor.

In some embodiments, a combo cable connector may include terminals arranged to enable cables to be disposed densely and provide high electrical performance at the same time. In some embodiments, the terminals may be arranged with multiple rows of signal terminals and power terminals aligned in one row and on opposite sides of the signal rows. In some embodiments, the signal terminals of adjacent rows may be disposed offset from each other in a row direction. In some embodiments, the numbers of signal terminals in adjacent rows may be different so as to reduce signal-to-signal crosstalk and enable power terminals to be disposed compactly in a same connector. In some embodiments, the one or more power terminals may be disposed in a single row with equal number of power terminals on opposite sides of the signal rows.

In some embodiments, a housing of the combo cable connector may include features that ensure the positioning of the terminals and therefore enable reliable connection even when, for example, the cables attached to the terminals are pulled at the other ends that are farther away from the connector. In some embodiments, the housing may include holes configured to hold the terminals and beams curving into respective holes so as to at least partially retain the terminals. The housing may include first holes each holding a signal terminal and second holes each holding a power terminal. The first holes may be arranged into a first row configured to hold a first row of signal terminals and a second row configured to hold a second row of signal terminals. The housing may include a row of recesses between the first row and second row of first holes so as to enable rework of cable terminations. For example, a tool may be inserted to a recess to assist with pulling out a terminal.

The signal terminals and the power terminals of the combo cable connector may be sized and shaped to receive signal cables and power cables, respectively. The terminals each may include a mating portion and a mounting portion opposite the mating portion and configured to receive the cables. Each signal terminal may include a metal sheet with multiple bends such that the mating portion of the signal terminal includes a bottom and opposing sides extending from the bottom. One pair of beams may project from the opposing sides. One pair of stop-pieces may project upwards from the opposing sides and configured to push against a limiting portion of the housing projecting into a respective first hole of the housing so as to at least partially retain the signal terminal. A barb may be cut from and extend beyond the bottom. The barb may be configured to face the beam of the first hole so as to prevent wrong insertion of the signal terminal into the first hole. A pair of protrusions may be cut from and extend beyond the opposing sides, respectively. The pair of protrusions may be held in matching grooves of the first hole such that rotation of the signal terminal inside the housing can be prevented.

Each power terminal may be formed of a metal sheet with multiple bends such that the mating portion of the power terminal includes two opposing sides, top and bottom. A side of the two opposing sides may be fastened to the top. The mating portion of the power terminal may include two pairs of beams so as to increase the contact stability and transmission ability for larger currents. Each pair may include two beams on the two opposing sides. Distal ends of the beams may be separated from distal ends of the mating portion by a front wall. Proximal ends of the beams may extend from a rear wall. A beam of a respective second hole of the housing may point toward the rear wall so as to prevent wrong insertion of the power terminal into the second hole and assist in retaining the power terminal in the second hole. A protrusion may be cut from and extend beyond the bottom. A respective second hole of the housing may include a slot for receiving the protrusion so as to prevent wrong insertion of the power terminal into the second hole.

The mounting portion of each terminal may include wire barrels configured to crimp a wire of a respective cable and insulation barrels configured to crimp an insulative portion of the respective cable. The barrels each may extend from the bottom of a respective terminal. The signal terminals may be inserted into respective first holes such that the barrels of the signal terminals extend toward a top of the housing. The power terminals may be inserted into respective second holes such that the barrels of the power terminals extend toward a bottom of the housing. Such a configuration enables a dense arrangement of the cables. For example, in some embodiments, the number of signal terminals in a first row may be less than the number of signal terminals in a second row, leaving additional space corresponding to the first row to host portions of the power cables.

In some embodiments, a combo board connector may include terminals held by a housing. The terminals each may include a mating portion configured to mate with a respective mating portion of a combo cable connector and a mounting portion configured to mount to a board. In some embodiments, the mounting portions of both signal terminals and power terminals may be configured to surface mount to the board so as to mitigate the effect of different levels of mounting forces desired by the signal terminals and power terminals.

Similar to the combo cable connector, in some embodiments, the terminals of a combo board connector may be arranged with multiple rows of signal terminals and power terminals aligned in one row and on opposite sides of the signal rows. In some embodiments, the signal terminals of adjacent rows may be disposed offset from each other in a row direction. In some embodiments, the numbers of signal terminals in adjacent rows may be different so as to reduce signal-to-signal crosstalk and enable power terminals to be disposed compactly in a same connector. In some embodiments, the one or more power terminals may be disposed in a single row with equal number of power terminals on opposite sides of the signal rows.

In some embodiments, a combo board connector may have a right angle configuration. The mating portions of the terminals may be perpendicular to the mounting portions of respective terminals. The mating portions of the signal terminals may be disposed into multiple rows. The mounting portions of the signal terminals may be disposed into one row. As the distance between adjacent mounting portions of the signal terminals may be smaller than the distance between adjacent mating portions of the signal terminals, the mounting portions of the signal terminals each may include a through-hole so as to reduce overlapping areas and therefore reduce crosstalk. The inclusion of the through-holes also may provide larger surface mounting areas with less terminal material. The power terminals may be aligned in one row and on opposite sides of the signal rows.

In some embodiments, a combo board connector may have a vertical configuration. The mating portions of the terminals may be parallel to the mounting portions of respective terminals. The signal terminals may be disposed into multiple rows while the power terminals may be aligned in one row and on opposite sides of the signal rows. The power terminals may be aligned in one row and on opposite sides of the signal rows.

In some embodiments, the first housing and the second housing may include matching features that enable reliable connection therebetween and therefore reliable connections between the mating portions of the first plurality of terminals and the mating portions of the second plurality of terminals held by the first housing and the second housing, respectively. In some embodiments, the second housing may enclose at least a portion of the first housing. In some embodiments, the first housing may include a spring arm, and the second housing may include a track slot into which the spring arm of the first housing is inserted. The spring arm and the track slot may be at a top side of the first housing and the second housing, respectively. In some embodiments, the first housing may include polarization walls, and the second housing may include polarization slots into which the polarization walls of the first housing are inserted. The polarization walls and the polarization slots may be at opposite lateral sides of the first housing and the second housing, respectively.

In some embodiments, a combo board connector may include reinforcing members that improves board retention. The reinforcing members configured to be compatible with various types of combo board connectors including, for example, the right angle configuration and the vertical configuration, so as to enable easy manufacturing and reusing molds for various types of connectors. In some embodiments, a combo board connector may include a pair of reinforce members disposed on opposite ends of the connector. Each reinforce member may include soldering zones on two orthogonal sides. The reinforce members each may be mounted in a connector housing with one of the two orthogonal sides exposed in a mounting face, depending on the combo board connector's configuration.

In some embodiments, housings of combo connectors may include features that ensure secure mating retention and prevent unintentional release. In some embodiments, a housing of a combo cable connector may include a spring arm bending from a proximal end adjacent a mating face of the housing towards a distal end adjacent a mounting face of the housing. The spring arm may include overhangs projecting outward from opposite sides of the spring arm. The housing may include a pair of pillars extending from a top of the housing and on opposite sides of the spring arm. The pair of pillars each may include overhangs projecting toward a respective side of the spring arm. The overhangs of the pillars may be on top of the overhangs of the spring arm so as to limit the movement of the spring arm. The pair of pillars may be disposed in locations to prevent over-insertion of a mating connector into the combo cable connector. In some embodiments, a housing of a combo board connector may include a track slot, which may be configured to receive at least a portion of a spring arm of a mating combo cable connector.

In some embodiments, the housings of the combo connectors may include features that enable easy and reliable assembly. In some embodiments, a housing of a combo cable connector may include end walls on opposite sides and polarization walls perpendicularly extending from respective end walls. In some embodiments, a housing of a combo board connector may include polarization slots, which may be configured to receive respective polarization walls of a mating combo cable connector. In some embodiments, reinforcement members of a combo board connector may be at least partially enclosed by respective polarization slots so as to provide a compact mating face.

Figure 2:
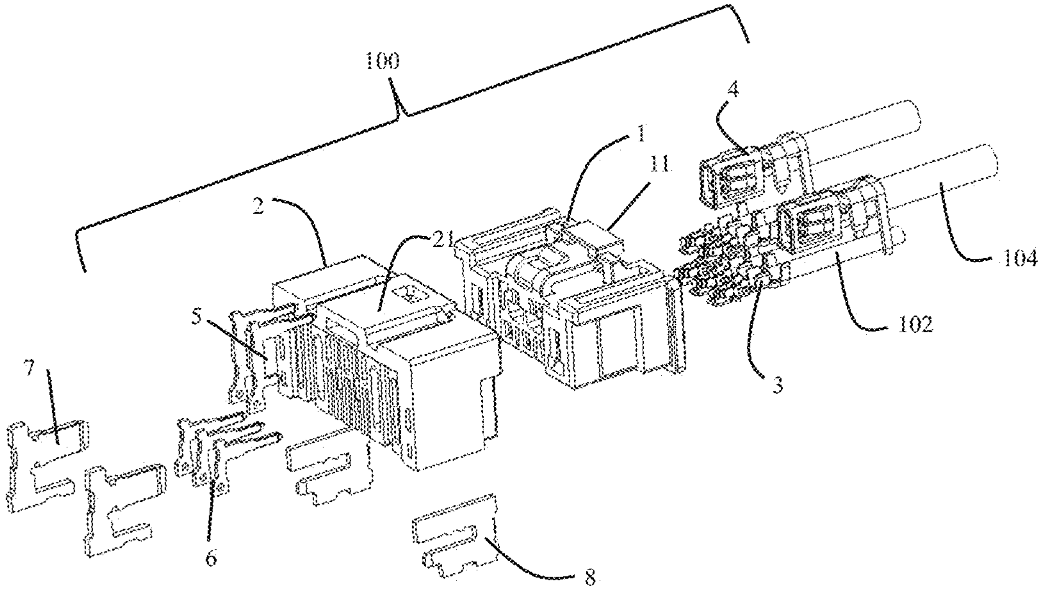
FIG. 2 is an exploded view of the connectors of FIG. 1.

FIG. 1 is a perspective view of an interconnection system 100 comprising a mated cable connector 106 and right angle board connector 108, according to some embodiments. FIG. 2 is an exploded view of the cable connector 106 and right angle board connector 108. As illustrated, the cable connector 106 may include a cable housing 1 holding cable signal terminals 3 and cable power terminals 4. The cable signal terminals 3 each may be configured to receive a signal cable 102. The cable power terminals 4 each may be configured to receiver a power cable 104. The cable housing 1 may include a spring arm 11.

The right angle board connector 108 may include a header housing 2 holding first header signal terminals 5, second header signal terminals 6, header power terminals 7, and reinforcing members 8. The header housing 2 may include a track slot 21 matched to the spring arm 11. A connection between the cable housing 1 and the header housing 2 may be established by insertion. When the cable housing 1 and the header housing 2 are connected by insertion, the spring arm 11 may be inserted into the track slot 21 so as to provide a retaining force. The header power terminals 7 may be inserted into respective cable power terminals 4. The first header signal terminals 5 and second header signal terminals 6 may be inserted into respective cable signal terminals 3.

In some embodiments, a connector housing such as the cable housing 1 and header housing 2 may be dielectric members molded from a dielectric material such as plastic or nylon. Examples of suitable materials include, but are not limited to, liquid crystal polymer (LCP), polyphenyline sulfide (PPS), high temperature nylon or polyphenylenoxide (PPO) or polypropylene (PP). Other suitable materials may be employed, as aspects of the present disclosure are not limited in this regard.

In some embodiments, conductive elements such as cable signal terminals 3, cable power terminals 4, first header signal terminals 5, second header signal terminals 6, and header power terminals 7 may be made of metal or any other material that is conductive and provides suitable mechanical properties for conductive elements in an electrical connector. Phosphor-bronze, beryllium copper and other copper alloys are non-limiting examples of materials that may be used. The conductive elements may be formed from such materials in any suitable way, including by stamping and/or forming.

Figure 3A:
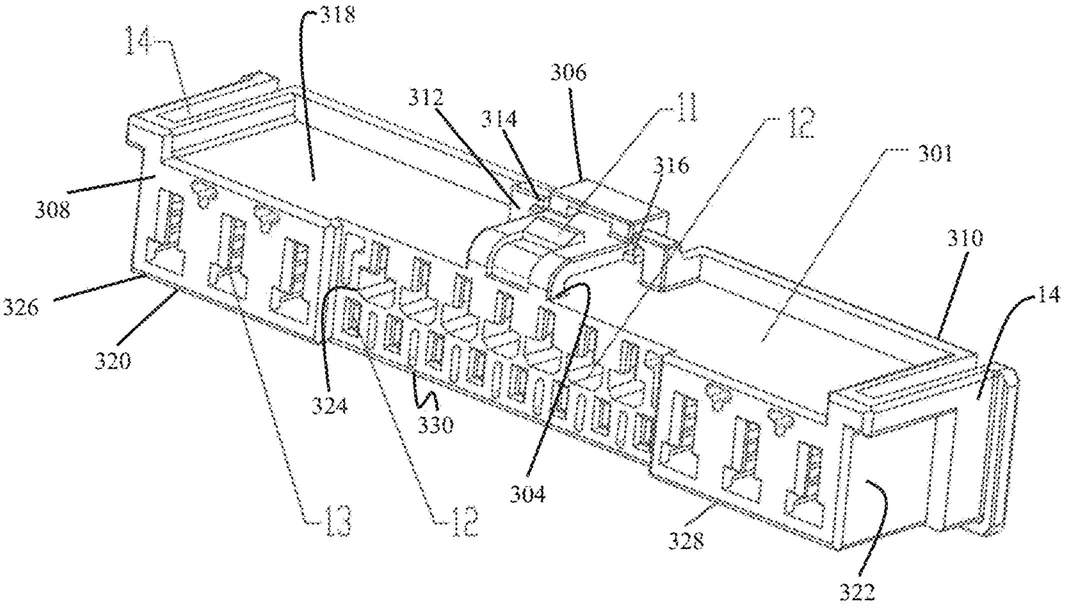
FIG. 3A is a front perspective view of a housing of an alternative configuration of a cable connector showing a mating face, configured to mate to a header connector.
Figure 3B:
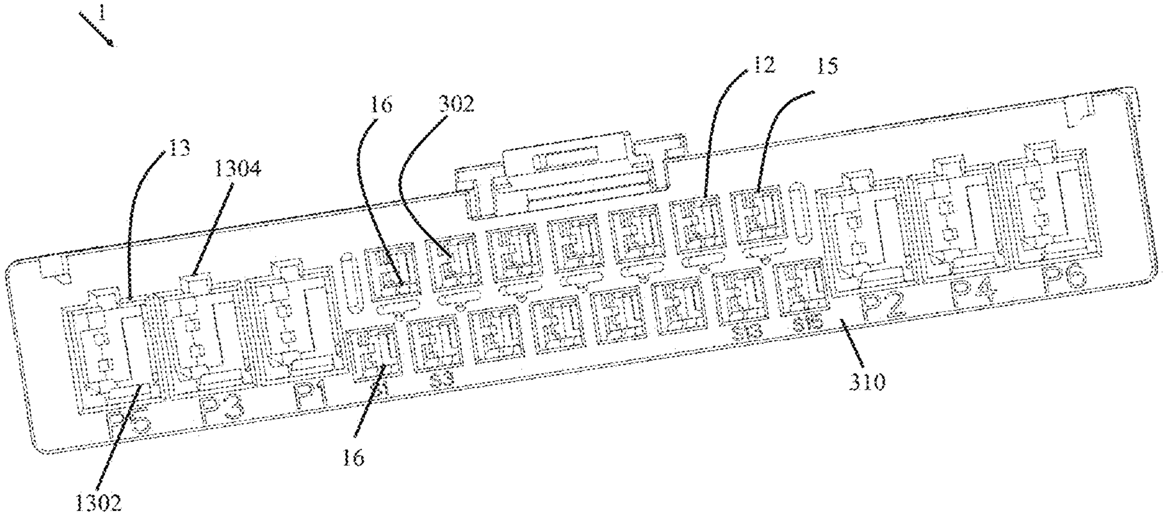
FIG. 3B is a rear perspective view of the cable housing of FIG. 3A, showing a mounting face, configured for receiving cables.
Figure 3C:
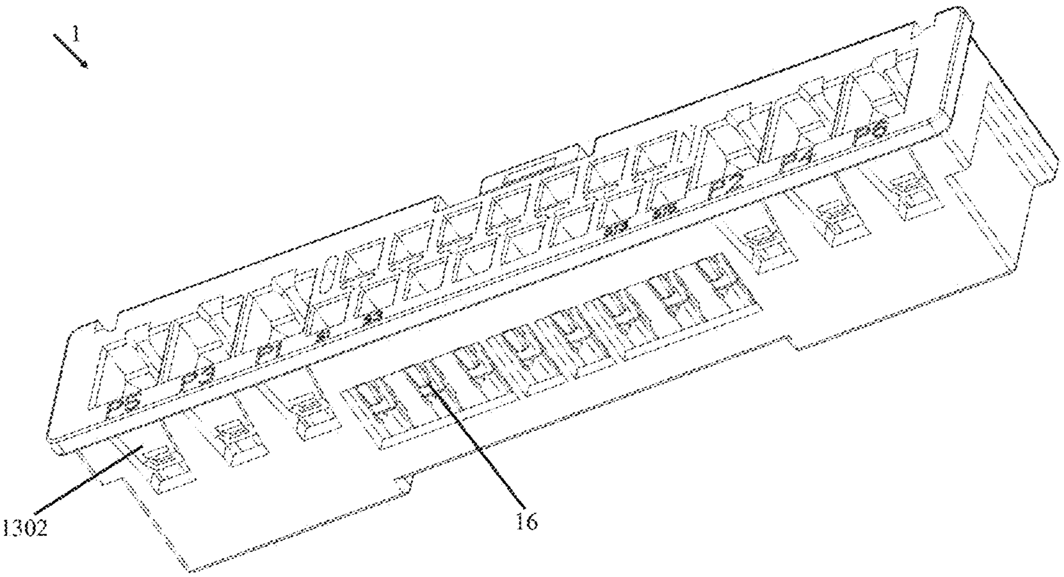
FIG. 3C is a bottom, rear perspective view of the cable housing of FIG. 3A, showing the mounting face and a bottom side.
Figure 11:
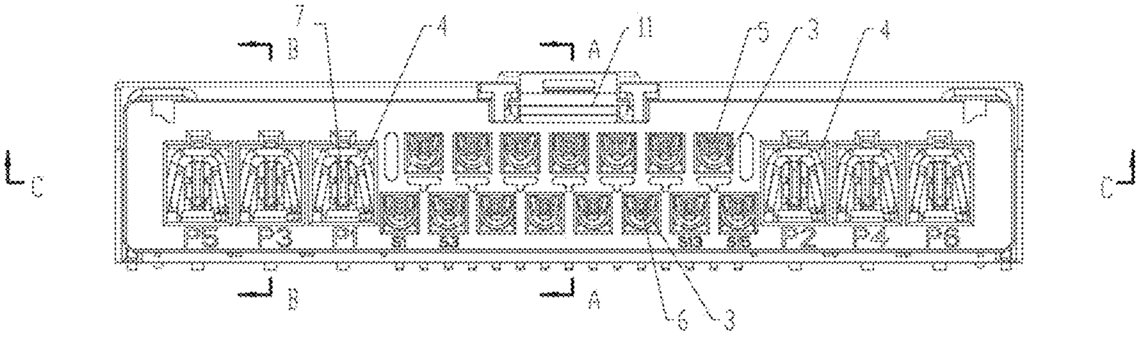
FIG. 11 is a rear elevational view of a cable connector mated to a header connector, showing the side of the cable connector for receiving cables, without cables attached to the terminals of the cable connector.
Figure 12:
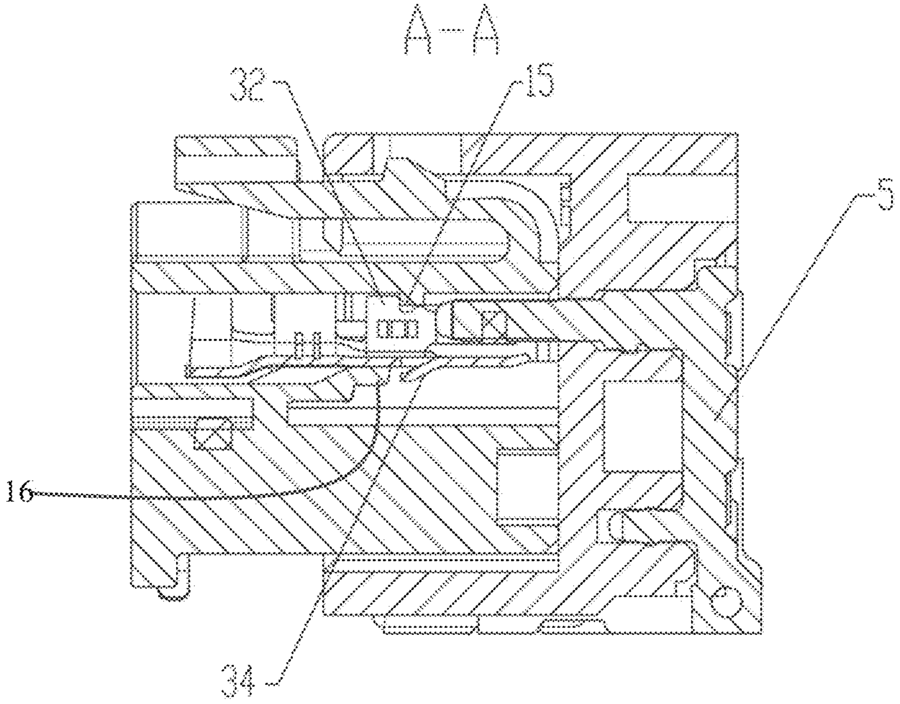
FIG. 12 is a cross-sectional view of the mated connectors taken along line A-A in FIG. 11.
Figure 13:
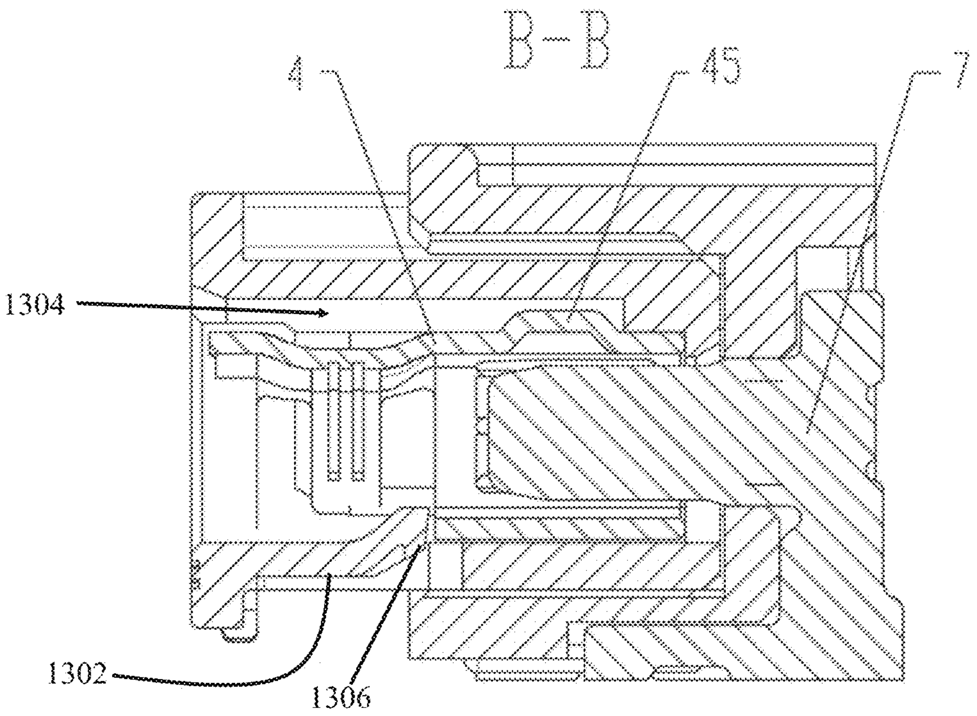
FIG. 13 is a cross-sectional view of the mated connectors taken along line B-B in FIG. 11.
Figure 14:
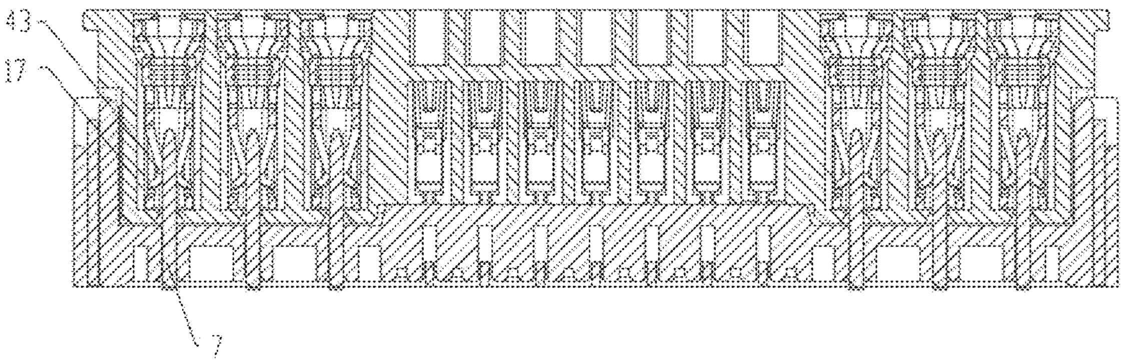
FIG. 14 is a cross-sectional view of the mated connectors taken along line C-C in FIG. 11.
Figure 15:
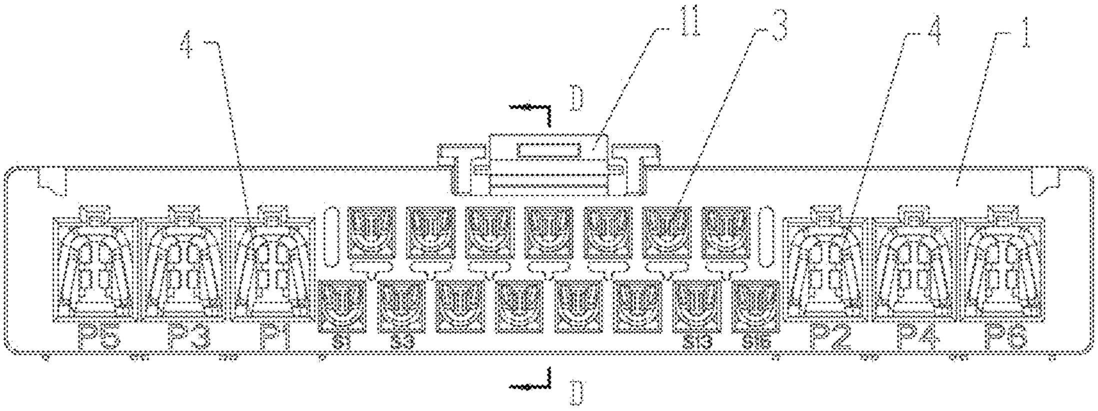
FIG. 15 is a rear elevational view of a cable connector without cables attached to the terminals of the cable connector.
Figure 16:
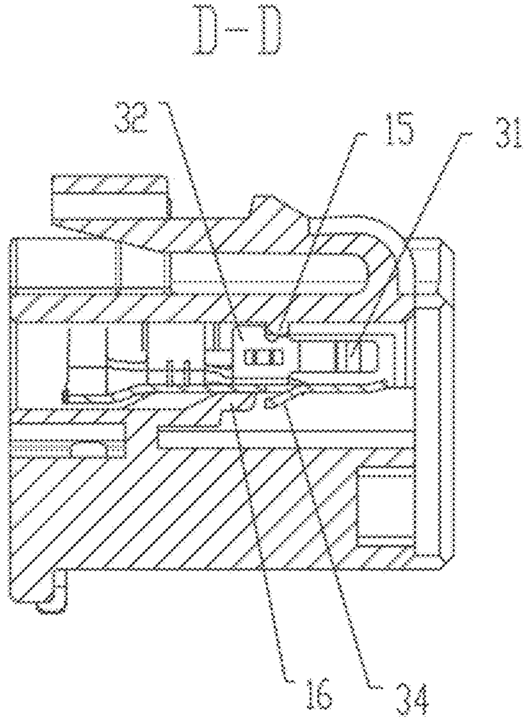
FIG. 16 is a cross-sectional view of the cable connector taken along D-D in FIG. 15.

FIG. 3A is a front perspective view of a cable housing 301 of an alternative configuration of a cable connector showing a side providing a mating face 308 to a header connector. FIG. 3B is a rear perspective view of the cable housing 301, showing a side providing a mounting face 310 for receiving cables. FIG. 3C is a bottom, rear perspective view of the cable housing 301, showing the mounting face 310 and a bottom side. FIG. 11 is a rear elevational view of the cable connector mated to a header connector, showing the side of the cable connector for receiving cables, without cables attached to the terminals of the cable connector. FIG. 12 is a cross-sectional view of the mated connectors taken along line A-A in FIG. 11. FIG. 13 is a cross-sectional view of the mated connectors taken along line B-B in FIG. 11. FIG. 14 is a cross-sectional view of the mated connectors taken along line C-C in FIG. 11. FIG. 15 is a rear elevational view of a cable connector without cables attached to the terminals of the cable connector. FIG. 16 is a cross-sectional view of the cable connector taken along D-D in FIG. 15.

As illustrated, the housing 301 may include cable signal terminal holes 12 and cable power terminal holes 13, each extending from the mating face 308 to the mounting face 310. A first portion 326 of the mating face 308 may include a number of cable power terminal holes 13. A second portion 328 of the mating face 308 may include the same number of cable power terminal holes 13 as the first portion 326 of the mating face 308. A third portion 330 of the mating face 308 may include the signal terminal holes 12 disposed between the first portion 326 and the second portion 328 of the mating face 308. The third portion 330 may be recessed with respect to the first portion 326 and the second portion 328 such that the cable power terminals 4 inserted in the cable power terminal holes 13 may mate with respective header power terminals 7 before the cable signal terminals 3 mate with respective header signal terminals 6.

The cable signal terminal holes 12 may be arranged in one or more rows. In the illustrated example, the cable signal terminal holes 12 may be disposed in a first row and a second row. The cable housing 301 may include one row of recesses 324 between the first row and second row of cable signal terminal holes 12 so as to enable rework of cable terminations. The number of cable signal terminal holes 12 in the first row may be smaller than the number of cable signal terminal holes 12 in the second row so as to reduce signal-to-signal crosstalk and enable power terminals to be disposed compactly on a same mating face. The cable housing 301 may include beams 16 curving into respective cable signal terminal holes 12, first limiting portion 15 projecting into respective cable signal terminal holes 12, and grooves 302 inside respective cable signal terminal holes 12.

The cable power terminal holes 13 may be arranged in one row with equal number of cable power terminal holes 13 on opposite sides of the first and second rows of cable signal terminal holes 12. The cable power terminal holes 13 each may include an error proofing slot 1304 to prevent wrong insertion of a respective cable power terminal 4. The cable housing 301 may include beams 1302 curving into respective cable power terminal holes 13.

The cable housing 301 may include a spring arm 11 bending from a proximal end 304 adjacent the mating face 308 of the cable housing 301 towards a distal end 306 adjacent the mounting face 310 of the cable housing 301. The spring arm 11 may include overhangs 316 projecting outward from opposite sides of the spring arm 11. The cable housing 301 may include a pair of pillars 312 extending from a top 318 of the cable housing 301 on the opposite sides of the spring arm 11. The pair of pillars 312 each may include overhangs 314 projecting toward a respective side of the opposite sides of the spring arm 11. The overhangs 314 of the pillars 312 may be disposed on top of the overhangs 316 of the spring arm 11 so as to limit the movement of the spring arm 11. The pair of pillars 312 may be disposed in locations to prevent over-insertion of a mating connector.

The cable housing 301 may include end walls 322 on opposite sides and polarization walls 14 extending from the end walls 322. The polarization walls 14 may extend perpendicular to the end walls 322 and be configured to be received by matching polarization slots of a mating connector to prevent wrong insertion.

Figure 5:
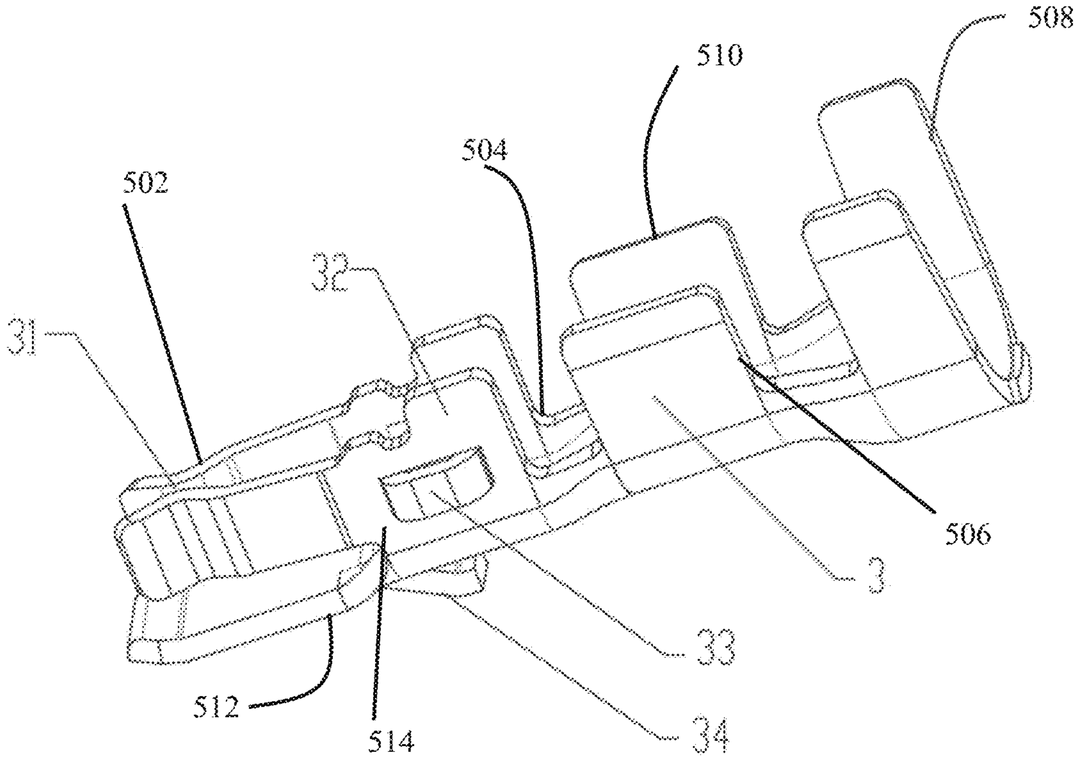
FIG. 5 is a perspective view of a cable signal terminal configured for insertion into the cable connector housing of FIG. 3A.

FIG. 5 is a perspective view of a cable signal terminal 3 configured for insertion into the cable connector housing 301. The cable signal terminal 3 may be formed by cutting and bending portions of a metal sheet. The cable signal terminal 3 may include a mating portion 502, a mounting portion 506 opposite the mating portion 502, and an intermediate portion 504 extending between the mating portion 502 and the mounting portion 506.

The cable signal terminal 3 may include features for attachment to a signal cable, which may include a wire surrounded by an insulator. For attachment to terminal 3, a segment of the insulation at an end of the cable may be removed, leaving an exposed wire portion. To support attachment to such a cable, terminal 3 may include a pair of wire barrels 510 configured to crimp to a wire of a respective signal cable and a pair of insulation barrels 508 configured to crimp to an insulative portion of the respective signal cable. In the configuration illustrated, the barrels appear as wings extending from bottom 512 of terminal 3. When terminal 3 is attached to a cable, the wings may be wrapped around a corresponding portion of the cable and crimped in place, resulting in a generally cylindrical barrel. For simplicity of illustration, terminal 3 is shown with the barrels in a state before they are crimped to a cable.

In the illustrated example, the cable signal terminal 3 may include a bottom 512 and opposing sides 514 extending from the bottom 512, with a pair of beams 31 extending from the opposing sides 514, respectively. The opposing sides 514 of the cable signal terminal 3 may be cut to form a pair of protrusions 33 that extend beyond respective sides of the opposing sides 514. In this example, protrusions 33 may be formed by cutting slits in the metal sheet from which terminal 3 is formed, with a strip between them. The central portion of that strip may be pressed outwards, while leaving the ends of the strip connected to the metal sheet, to simply form a structurally sound protrusion. The pair of protrusions 33 may be configured to fit into the grooves 302 of a respective cable signal terminal hole 12 so as to prevent undesirable rotation of the cable signal terminal 3 inside the cable signal terminal hole 12. The cable signal terminal 3 may include stop-pieces 32 extending upwards from respective sides of the opposing sides 514. A barb 34 may be cut from and extend beyond the bottom 512.

As illustrated in FIG. 12 and FIG. 16, the stop-pieces 32 may be configured to push against a respective limiting portion 15 of the respective cable signal terminal hole 12 so as to at least partially retain the cable signal terminal 13. The barb may be configured to face the beam 16 curving into the respective cable signal terminal hole 12, thereby limiting the position of the cable signal terminal 3 in the front-rear direction and preventing wrong insertion of the cable signal terminal 3 into the respective cable signal terminal hole 12.

Figure 6:
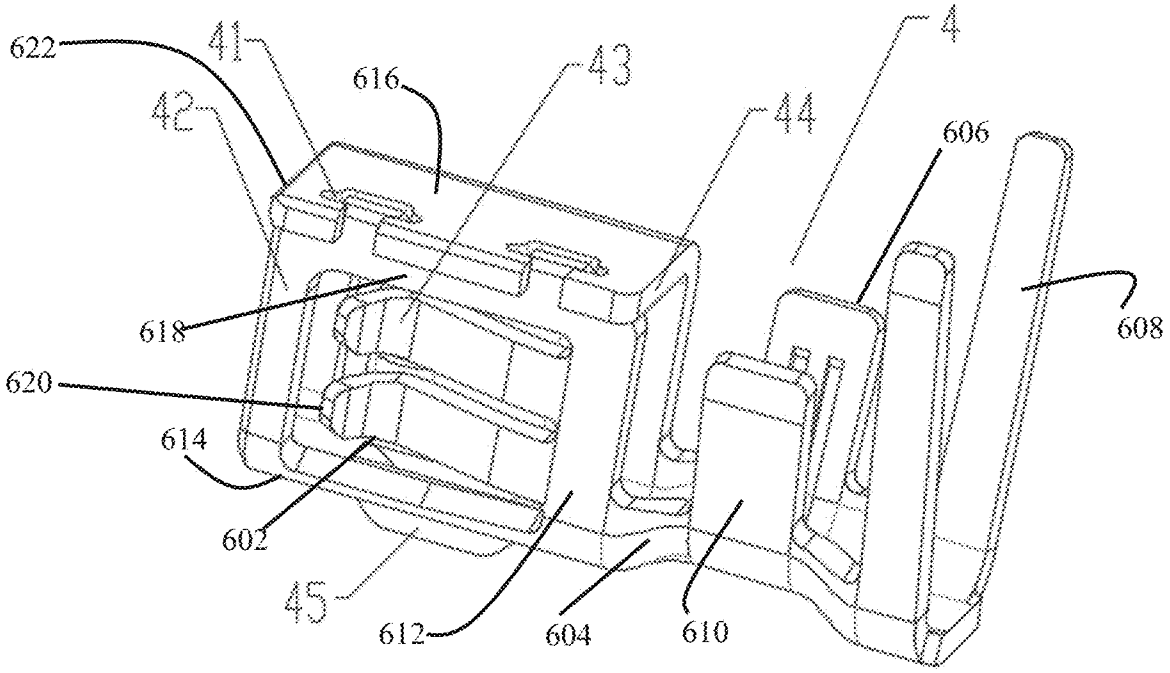
FIG. 6 is a perspective view of a cable power terminal configured for insertion into the cable connector housing of FIG. 3A.

FIG. 6 is a perspective view of a cable power terminal 4 configured for insertion into the cable connector housing 301. The cable power terminal 4 may be formed by cutting and bending portions of a metal sheet. The cable power terminal 4 may include a mating portion 602, a mounting portion 606 opposite the mating portion 602, and an intermediate portion 604 extending between the mating portion 602 and the mounting portion 606. The cable power terminal 4 may include a pair of wire barrels 610 configured to crimp to a wire of a respective power cable and a pair of insulation barrels 608 configured to crimp to an insulative portion of the respective power cable.

In the illustrated example, the cable power terminal 4 may include two opposing sides 618, a top 616 and a bottom 614, with a side 618 fastened to the top 616 through, for example, fastening structures 41. A perimeter of a front and/or rear of the mating portion 602 of the cable power terminal 4 may be rectangular shaped. The cable power terminal 4 may include two pairs of beams 43 extending from rear walls 612. Distal ends 620 of the beams 43 may be separate from a distal end 622 of the cable power terminal 4 by a front wall 42.

The bottom 614 of the cable power terminal 4 may be cut to form a protrusion 45 that extend beyond the bottom 614. Protrusion 45 may be formed from the same sheet of metal from which the rest of the terminal 4 is formed. Protrusion 45, for example, may be formed by cutting slits in the metal sheet, leaving a strip between them. The central portion of that strip may be pressed outwards, while the end portions remain attached to the metal sheet. Such a configuration may be both robust and may support a low resistance current path between the front of terminal 4 and the mounting portion 606.

As illustrated in FIG. 13, the protrusion 45 may be configured to fit into the error proofing slot 1304 of a respective cable power terminal hole 13 so as to prevent wrong insertion of the cable power terminal 4 into a respective cable power terminal hole 13. A respective beam 1302 curving into the respective cable power terminal hole 13 may be configured to point to the rear of the mating portion 602 of the cable power terminal 4, such that a distal end 1306 of the respective beam 1302 may be between the mating portion 602 and the mounting portion 606 of the power terminal 4.

Figure 4A:
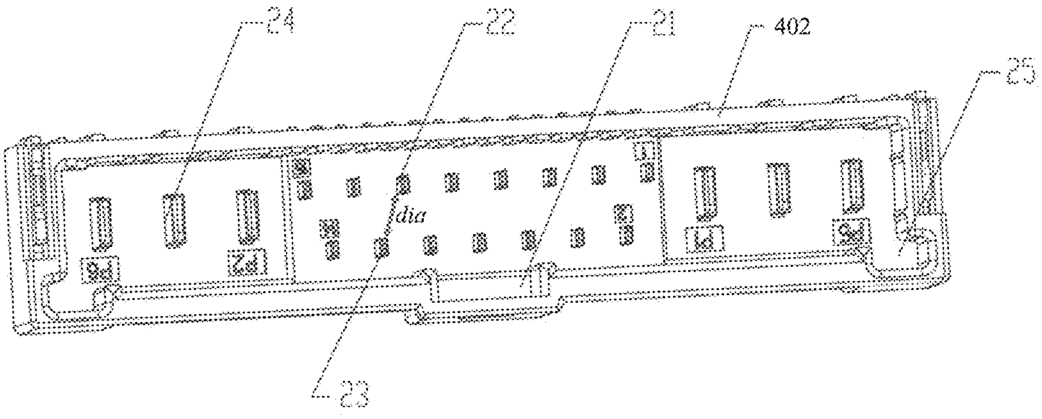
FIG. 4A is a front perspective view of a housing of a right-angle header connector configured for mating with a cable connector formed with the housing of FIG. 3A.
Figure 4B:
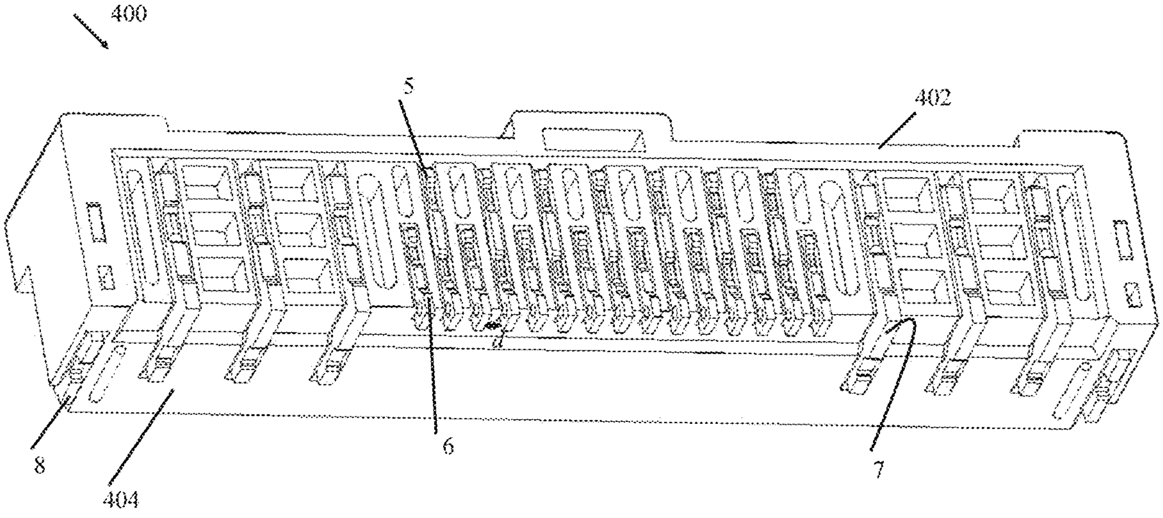
FIG. 4B is a bottom, rear perspective view of the right-angle header connector having the housing of FIG. 4A.

FIG. 4A is a front perspective view of a housing 402 of a right-angle header connector 400 configured for mating with the cable connector formed with the housing 301. FIG. 4B is a bottom, rear perspective view of the right-angle header connector 400. As illustrated, the housing 402 may include header power terminal holes 24 symmetrically disposed on two sides of the header housing 402 and configured to hold header power terminals 7. The housing 402 may include an upper row of first header signal terminal holes 22 and a lower row of second header signal terminal holes 23. The header signal terminal holes 22 and 23 may be provided in a middle part of the header housing 2, with a row of header signal terminals 5 and a row of header signal terminals 6 inserted in the upper row and the lower row of header signal terminal holes, respectively. The housing 402 may include a track slot 21 configured to receive a matching feature of a mating connector (e.g., the spring arm 11 of the cable connector). The housing 402 may include polarizations slots on opposite sides and configured to receive matching feature of a mating connector (e.g., the polarization walls 14 of the cable connector).

Figure 7:
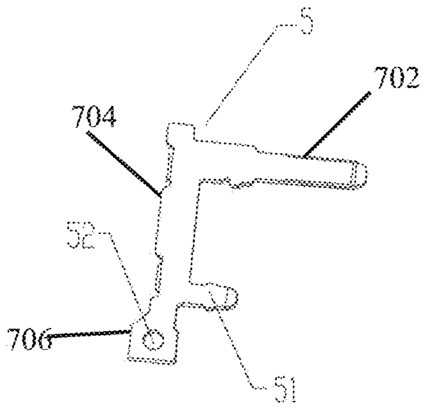
FIG. 7 is a perspective view of a first header signal terminal configured for insertion into the housing of FIG. 4A.

FIG. 7 is a perspective view of a first header signal terminal 5 configured for insertion into a respective first header signal terminal hole 22 of the housing 402 of the right-angle header connector 400. The first header signal terminal 5 may include a mating portion 702, a mounting portion 706, and an intermediate portion 704 extending between the mating portion 702 and mounting portion 706. As illustrated, a protrusion 51 may be provided at a terminal position of the header signal terminal 5, being capable of additionally increasing the retaining force of the terminal.

Figure 8:
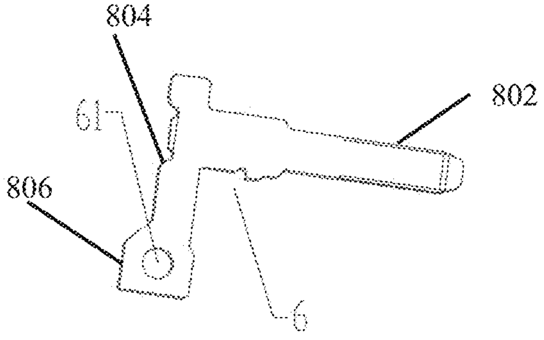
FIG. 8 is a perspective view of a second header signal terminal configured for insertion into the housing of FIG. 4A.

FIG. 8 is a perspective view of a second header signal terminal 6 configured for insertion into a second header signal terminal hole 23 of the housing 402 of the right-angle header connector 400. The second header signal terminal 6 may include a mating portion 802, a mounting portion 806, and an intermediate portion 804 extending between the mating portion 802 and mounting portion 806.

As illustrated in FIG. 4A and FIG. 4B, mounting ends of the header signal terminals 5 and header signal terminals 6 may be aligned in one row. While a diagonal distance dia may determine signal-to-signal distance at the mating face, the signal-to-signal distance d at the mounting face may be shorter than the diagonal distance dia. Referring back to FIG. 7 and FIG. 8, through-holes 52 and 61 may be provided at the mounting portions 706 and 806 of the header signal terminal 5 and header signal terminal 6, respectively. Such a configuration may not only increase the solder acceptance area but also reduce overlapping area between adjacent mounting portions 706 and 806 and thereby reduce crosstalk that may be cause by shorter signal-to-signal distance d_at the mounting face.

Figure 9:
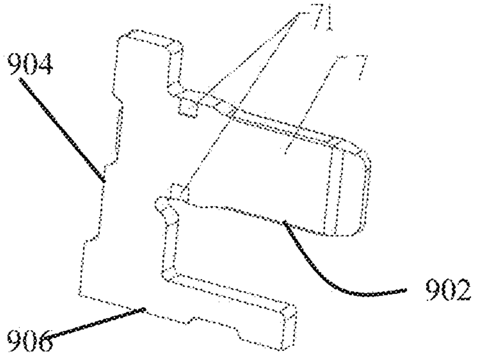
FIG. 9 is a perspective view of a header power terminal configured for insertion into the housing of FIG. 4A.

FIG. 9 is a perspective view of a header power terminal 7 configured for insertion into a respective header power terminal hole 24 of the housing 402 of the right-angle header connector 400. The header power terminal 7 may include a mating portion 902, a mounting portion 906, and an intermediate portion 904 extending between the mating portion 902 and mounting portion 906. As illustrated, bulges 71 may be provided on the header power terminal 7 so as to increase the terminal retaining force after terminal assembly.

Figure 10:
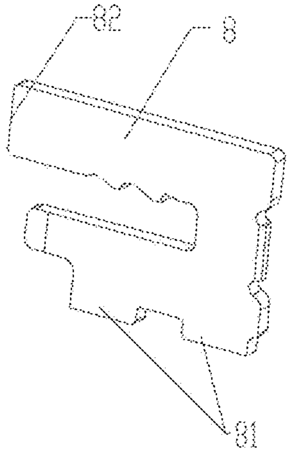
FIG. 10 is a perspective view of a reinforcing member configured for insertion into the housing of FIG. 4A.

FIG. 10 is a perspective view of a reinforcing member 8 configured for insertion into the housing 402 of the right-angle header connector. The reinforcing member 8 may include first contact portion 81 and second contact portion 82 on two orthogonal sides. In the illustrated example of FIG. 4B, the reinforcing member 8 may be mounted in the housing 402 with the first contact portion 81 exposed in a mounting face 404. In an alternative embodiment such as a vertical header connector 1708 shown in FIG. 17A and FIG. 17B, the reinforcing member 8 may be mounted in a housing 202 with the second contact portion 82 exposed in a mounting face. Such a configuration enables the use of the reinforcing member in alternative embodiments and therefore save design and manufacturing cost.

As shown in FIG. 14, a cable housing step 17 may be provided at a position on the cable housing 1 corresponding to the limiting arm 44 of a respective cable power terminal 4. The beams 43 of respective cable power terminals 4 may be provided below respective fastening structures 41. When a cable power supply terminal 4 mates with a header power terminal 7, the respective beams 43 may be pushed outward by the header power terminal 7 and therefore interfere with the cable housing step 17 to increase the contact force applied to the header power terminal 7.

Figure 17A:
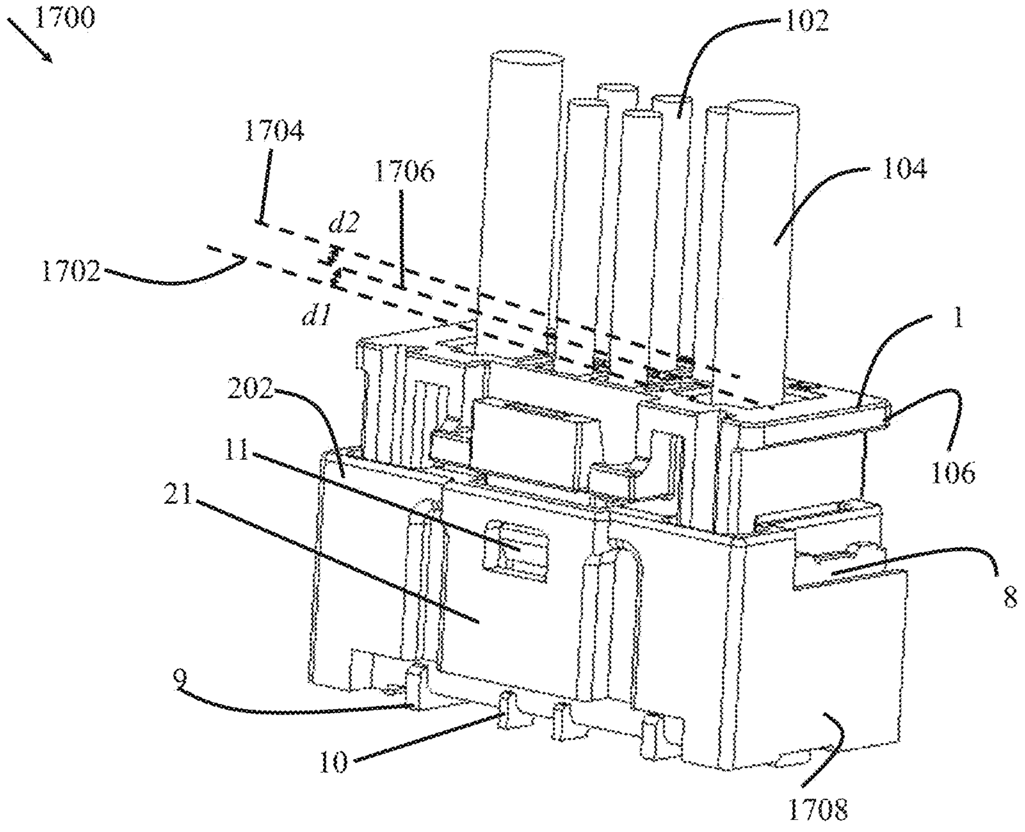
FIG. 17A is a perspective view of the cable connector of FIG. 1 mated with a vertical board connector, according to some embodiments.
Figure 17B:
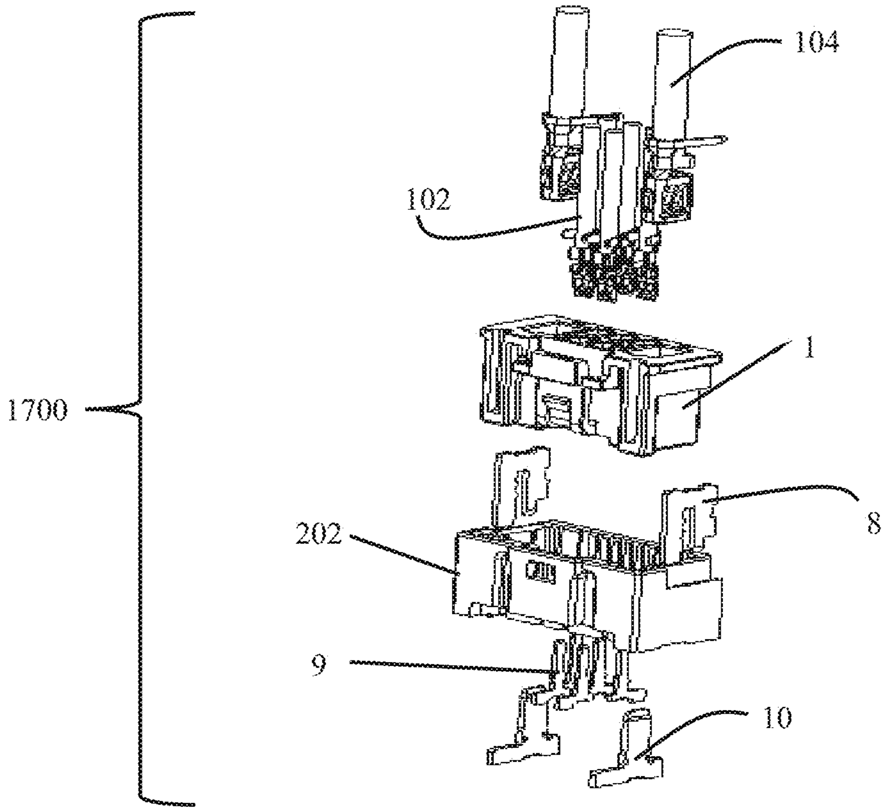
FIG. 17B is an exploded view of the connectors of FIG. 17A.

FIG. 17A is a perspective view of an interconnection system 1700 comprising the cable connector 106 mated with the vertical board connector 1708, according to some embodiments. FIG. 17B is an exploded view of the cable connector 106 mated with the vertical board connector 1708. As illustrated, the cable connector 106 may include the signal cables 102 and power cables 104. The signal cables 102 may be disposed in a first row 1702 and a second row 1704. The power cables 104 may be disposed in a row 1706. The row 1706 of power cables 104 may be separate from the first row 1702 of signal cables 102 by a first distance d1 perpendicular to the row direction. The row 1706 of power cables 104 may be separate from the second row 1704 of signal cables 102 by a second distance d2 perpendicular to the row direction. The first distance d1 may be smaller than the second distance d2 so as to enable a compact mounting face.

The vertical board connector 1708 may include a header housing 202 holding header signal terminals 10, header power terminals 9, and reinforcing members 8. The header housing 202 may include a track slot 21 matched to the spring arm 11. A connection between the cable housing 1 and the header housing 202 may be established by insertion. When the cable housing 1 and the header housing 202 are connected by insertion, the spring arm 11 may be inserted into the track slot 21 so as to provide a retaining force. The header power terminals 9 may be inserted into the cable power terminals 4. The header signal terminals 10 may be inserted into the cable signal terminals 3.

Figure 18A:
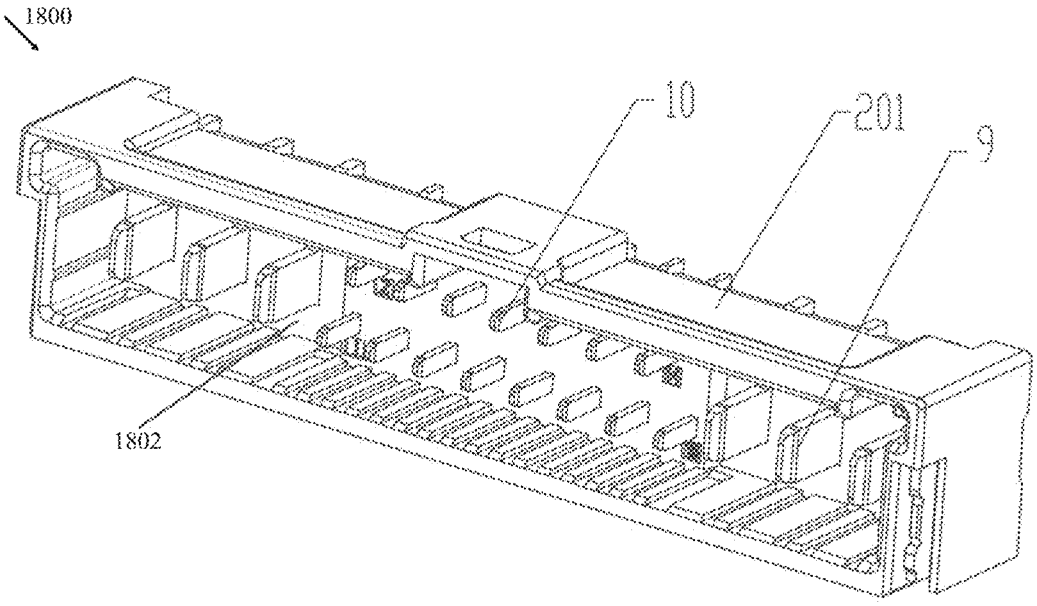
FIG. 18A is a front perspective view of a vertical header connector showing a mating face.
Figure 18B:
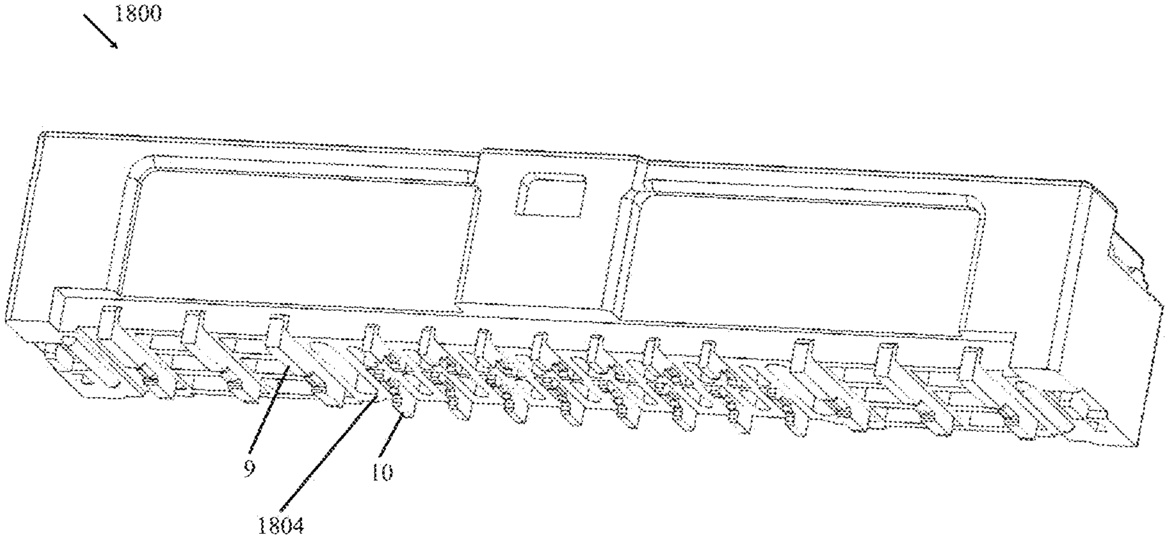
FIG. 18B is a top, rear perspective view of the vertical header connector of FIG. 18A showing a mounting face.

FIG. 18A is a front perspective view of a vertical header connector 1800 showing a mating face 1802 to a cable connector having the cable housing 301. The vertical header connector 1800 may include a header housing 201 holding the header signal terminals 10 and header power terminals 9. The mating face 1802 of the vertical header connector 1800 may be substantially similar to the mating face of the right angle board connector 400 of FIG. 4B. FIG. 18B is a top, rear perspective view of the vertical header connector 1800 showing a mounting face 1804. The header signal terminals 10 may be disposed into two offset rows at both the mating face 1802 and the mounting face 1804.

Figure 19:
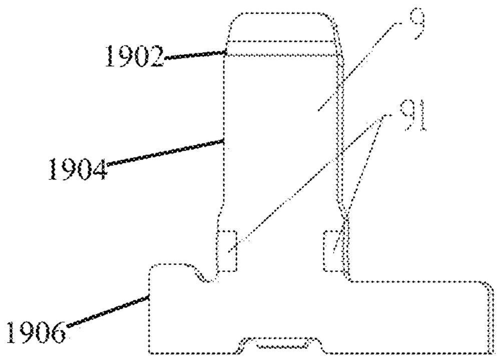
FIG. 19 is a perspective view of a header power terminal of the vertical header connector of FIG. 18A.

FIG. 19 is a perspective view of a header power terminal 9 of the vertical header connector 1800. The header power terminal 9 may include a mating portion 1902, a mounting portion 1906, and an intermediate portion 1904 extending between the mating portion 1902 and mounting portion 1906. As illustrated, bulges 91 may be provided on the header power terminal 9 so as to increase the terminal retaining force after terminal assembly.

Figure 20:
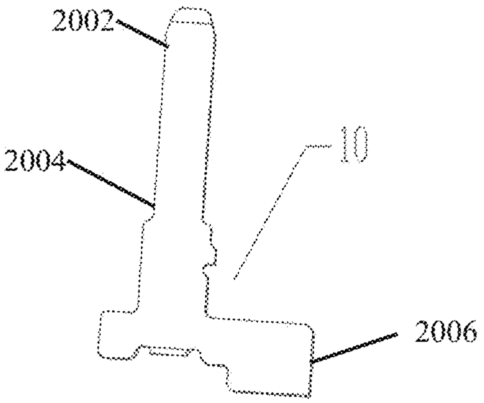
FIG. 20 is a perspective view of a header signal terminal of the vertical header connector of FIG. 18A.

FIG. 20 is a perspective view of a header signal terminal 10 of the vertical header connector 1800. The header signal terminal 10 may include a mating portion 2002, a mounting portion 2006, and an intermediate portion 904 extending between the mating portion 902 and mounting portion 2006.

Various changes may be made to the illustrative structures shown and described herein. Manufacturing techniques may also be varied. Furthermore, although many inventive aspects are shown and described with reference to a cable connector, it should be appreciated that aspects of the present disclosure are not limited in this regard, as any of the inventive concepts, whether alone or in combination with one or more other inventive concepts, may be used in other types of electrical connectors, such as right angle connectors, stacking connectors, I/O connectors, chip sockets, etc.

The present disclosure is not limited to the details of construction or the arrangements of components set forth in the foregoing description and/or the drawings. Various embodiments are provided solely for purposes of illustration, and the concepts described herein are capable of being practiced or carried out in other ways. Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items.

What is claimed is:

1. A connector comprising:

a housing; and a plurality of terminals held by the housing, each of the plurality of terminals comprising a mating portion and a mounting portion opposite the mating portion and configured to receive a cable, the plurality of terminals comprising one or more rows of signal terminals, the mating portion of each signal terminal comprising one pair of beams, and one or more power terminals disposed on opposite sides of the one or more rows of signal terminals, the mating portion of each power terminal comprising two pairs of beams, wherein the mating portion of each of the one or more power terminals comprises a protrusion extending beyond a bottom of the power terminal.

2. The connector of claim 1, wherein the housing comprises one or more first holes each holding one of the one or more rows of signal terminals, and one or more second holes each holding one of the one or more power terminals.

3. The connector of claim 1, wherein:

the one or more rows of signal terminals comprise a first row of signal terminals and a second row of signal terminals.

4. The connector of claim 3, wherein:

the first row consists of an odd number of signal terminals and the second row consists of an even number of signal terminals, or the first row consists of an even number of signal terminals and the second row consists of an odd number of signal terminals.

5. The connector of claim 1, wherein each of the one or more power terminals comprises a metal sheet with a plurality of bends such that the mating portion of the power terminal comprises two opposing sides, top and bottom.

6. The connector of claim 5, wherein the two pairs of beams of the mating portion of each of the one or more power terminals each comprises a beam on a side of the two opposing sides.

7. The connector of claim 6, wherein distal ends of the two pairs of beams are separated from distal end of the mating portion by a front wall.

8. The connector of claim 7, wherein proximal ends of the two pairs of beams extend from a rear wall.

9. The connector of claim 5, wherein:

the housing comprises a plurality of holes and a plurality of beams curving into respective holes, the plurality of terminals are held in respective holes of the housing and at least partially retained by respective beams of the housing, and for each of the one or more power terminals, a distal end of the beam curving into a respective hole is between the mating portion and the mounting portion of the power terminal inserted into the hole.

10. The connector of claim 9, wherein:

for each of the one or more power terminals, the beam curving into a respective hole is adjacent to the top of the mating portion of the power terminal inserted into the hole.

11. The connector of claim 1, wherein each of the one or more rows of signal terminals comprises a metal sheet with a plurality of bends such that the signal terminal comprises a bottom and opposing sides extending from the bottom with the pair of beams projecting from the opposing sides, respectively.

12. The connector of claim 11, wherein each of the one or more rows of signal terminals comprises a pair of protrusions cut from and extending beyond the opposing sides, respectively.

13. The connector of claim 11, wherein:

the one or more signal terminals comprise barbs cut from and extending beyond the bottom.

14. The connector of claim 11, wherein the sides of each of the one or more rows of signal terminals comprise stop-pieces extending away from the bottom.

15. The connector of claim 14, wherein the housing comprises:

a plurality of holes, and a plurality of first limiting portions projecting into respective holes and configured to operate with the stop-pieces of respective signal terminals to hold the signal terminals in position.

16. The connector of claim 1, wherein the housing comprises:

a mating face, a mounting face opposite the mating face, and a spring arm bending from a proximal end adjacent the mating face towards a distal end adjacent the mounting face.

17. The connector of claim 16, wherein:

the housing comprises a pair of pillars extending on opposite sides of the spring arm, the pair of pillars each comprising overhangs projecting toward the spring arm, the spring arm comprises overhangs projecting toward the pair of pillars, respectively, and the overhangs of the pillars are on top of the overhangs of the spring arm so as to limit the movement of the spring arm.

18. A connector comprising:

a housing; and a plurality of terminals held by the housing, each of the plurality of terminals comprising a mating portion and a mounting portion opposite the mating portion, the plurality of terminals comprising a first number of signal terminals, the mating portions of the first number of signal terminal aligned in a first row, a second number of signal terminals, the mating portions of the second number of signal terminal aligned in a second row, the second number being different from the first number, and one or more power terminals comprising mating portions disposed on opposite sides of the first and second rows of mating portions of the signal terminals.

19. The connector of claim 18, wherein:

the mating portions of the signal terminals in the first row are offset from the mating portions of the signal terminals in the second row in a row direction.

20. The connector of claim 18, wherein:

the mating portions of the one or more power terminals are disposed in a single row with equal number of power terminals on opposite sides of the first and second rows of mating portions of the signal terminals.

21. A connector comprising:

a housing comprising a top and a bottom; and a plurality of terminals held by the housing, each of the plurality of terminals comprising a bottom and barrels extending from the bottom and configured to receive a cable, the plurality of terminals comprising one or more signal terminals and one or more power terminals, the barrels of the one or more signal terminals extending toward the top of the housing and the barrels of the one or more power terminals extending toward the bottom of the housing.

22. The connector of claim 21, wherein the housing comprises a spring arm extending above the top of the housing and a pair of pillars extending on opposite sides of the spring arm and configured to protect the spring arm and block over-insertion of a mating component into the connector.

23. The connector of claim 22, wherein each of the one or more power terminals comprises a protrusion cut from and extending beyond a bottom of the power terminal.

24. The connector of claim 21, wherein the housing comprises an end wall and a polarization wall extending from the end wall.

25. The connector of claim 24, wherein the polarization wall extends perpendicular to the end wall.

* * * * *